(12) United States Patent
Arkashovski et al.

(10) Patent No.: US 8,391,695 B2
(45) Date of Patent: Mar. 5, 2013

(54) VEHICLE SURFACES CLEANING AND DE-ICING SYSTEM AND METHOD

(75) Inventors: Uri Arkashovski, Petach Tikva (IL); Vychislav Ivanov, Farmington Hills, MI (US); Joseph Rogozinski, Ramat Gan (IL)

(73) Assignee: M-Heat Investors, LLC, Bettendorf, IA (US)

( * ) Notice: Subject to any disclaimer, the term of this patent is extended or adjusted under 35 U.S.C. 154(b) by 875 days.

(21) Appl. No.: 12/374,105

(22) PCT Filed: Jul. 18, 2007

(86) PCT No.: PCT/IL2007/000910
§ 371 (c)(1), (2), (4) Date: Jun. 25, 2009

(87) PCT Pub. No.: WO2008/012801
PCT Pub. Date: Jan. 31, 2008

(65) Prior Publication Data
US 2009/0283605 A1   Nov. 19, 2009

Related U.S. Application Data

(60) Provisional application No. 60/833,115, filed on Jul. 24, 2006, provisional application No. 60/833,056, filed on Jul. 24, 2006, provisional application No. 60/836,734, filed on Aug. 9, 2006.

(51) Int. Cl.
*F24H 1/10* (2006.01)
(52) U.S. Cl. ......... 392/484; 392/479; 392/491; 392/465
(58) Field of Classification Search .................. 392/479, 392/468, 484
See application file for complete search history.

(56) References Cited

U.S. PATENT DOCUMENTS

| | | |
|---|---|---|
| 653,629 A | 7/1900 | Schneider |
| 1,523,156 A | 1/1925 | Adams |
| 1,636,190 A | 7/1927 | Mahoney |
| 2,607,944 A | 8/1952 | Turner et al. |
| 3,202,447 A | 8/1965 | Whaley et al. |
| 3,203,447 A | 8/1965 | Bremner et al. |
| 3,319,891 A | 5/1967 | Campbell |
| 3,332,045 A | 7/1967 | Rodaway |
| 3,418,676 A | 12/1968 | Byczkowski et al. |
| 3,427,675 A | 2/1969 | Tibbet |
| 3,446,942 A | 5/1969 | Letsinger et al. |

(Continued)

FOREIGN PATENT DOCUMENTS

| | | |
|---|---|---|
| CH | 101971 | 11/1923 |
| DE | 33 24 634 | 1/1985 |

(Continued)

OTHER PUBLICATIONS

Japanese Utility Model Publication No. 44217/1993.

(Continued)

*Primary Examiner* — Thor Campbell
(74) *Attorney, Agent, or Firm* — Weingarten, Schurgin, Gagnebin & Lebovici LLP

(57) ABSTRACT

A liquid heating unit for use in a vehicle surface cleaning and deicing system, the liquid heating unit including a liquid heating assembly, having an inlet through which a washing fluid is received from a reservoir and an outlet through which the fluid is discharged for cleaning at least one vehicle surface, at least one heating element for heating fluid in the liquid heating assembly and a freeze protection element located in the liquid heating assembly, the freeze protection element including a deformable container being deformable in at least two generally perpendicular axial directions.

10 Claims, 18 Drawing Sheets

U.S. PATENT DOCUMENTS

| | | | |
|---|---|---|---|
| 3,475,588 A | 10/1969 | McMaster | |
| 3,524,044 A | 8/1970 | Liardi | |
| 3,537,900 A | 11/1970 | Halbert | |
| 3,632,042 A | 1/1972 | Goulish et al. | |
| 3,643,193 A | 2/1972 | Prouty | |
| 3,711,679 A | 1/1973 | Moschkau et al. | |
| 3,716,886 A | 2/1973 | Klomp | |
| 3,747,500 A | 7/1973 | Redd | |
| 3,888,412 A | 6/1975 | Lindo | |
| 3,977,436 A | 8/1976 | Larner | |
| 3,979,068 A | 9/1976 | Applebaum | |
| 4,088,269 A | 5/1978 | Schlick | |
| 4,090,668 A | 5/1978 | Kochenour | |
| 4,106,508 A | 8/1978 | Berlin | |
| 4,159,026 A | 6/1979 | Williamson | |
| 4,212,425 A | 7/1980 | Schlick | |
| 4,253,493 A | 3/1981 | English | |
| 4,275,477 A | 6/1981 | Kato | |
| 4,295,111 A | 10/1981 | Wang | |
| 4,306,589 A | 12/1981 | Harned et al. | |
| 4,403,756 A | 9/1983 | Berlin et al. | |
| 4,431,954 A | 2/1984 | Carpenter et al. | |
| 4,489,863 A | 12/1984 | Horchos et al. | |
| 4,508,957 A | 4/1985 | Rocchitelli | |
| 4,524,797 A | 6/1985 | Lungu | |
| 4,534,539 A | 8/1985 | Dettmann | |
| 4,561,632 A | 12/1985 | Hugler | |
| 4,574,841 A | 3/1986 | Hugler | |
| 4,585,980 A | 4/1986 | Gille et al. | |
| 4,616,780 A | 10/1986 | Abbott | |
| 4,638,525 A | 1/1987 | Sugita et al. | |
| 4,670,695 A | 6/1987 | Licata et al. | |
| 4,687,907 A * | 8/1987 | Barkley et al. | 392/473 |
| 4,690,371 A | 9/1987 | Bosley et al. | |
| 4,815,662 A | 3/1989 | Hunter | |
| 4,832,262 A | 5/1989 | Robertson | |
| 4,834,289 A | 5/1989 | Hunter | |
| 4,866,357 A | 9/1989 | Miller et al. | |
| 4,866,359 A | 9/1989 | Schmid et al. | |
| 4,877,186 A | 10/1989 | Scholl | |
| 4,922,570 A | 5/1990 | Hirohama et al. | |
| 4,946,009 A | 8/1990 | Knutson | |
| 5,012,977 A | 5/1991 | Karklins et al. | |
| 5,034,714 A | 7/1991 | Bratkowski et al. | |
| 5,118,040 A | 6/1992 | Abe | |
| 5,134,266 A | 7/1992 | Peppard | |
| 5,141,157 A | 8/1992 | Han et al. | |
| 5,141,160 A | 8/1992 | Waters | |
| 5,173,586 A | 12/1992 | Gold | |
| 5,177,418 A | 1/1993 | Muller | |
| 5,195,813 A | 3/1993 | Brown | |
| 5,203,049 A | 4/1993 | Nogawa | |
| 5,254,083 A | 10/1993 | Gentelia et al. | |
| 5,271,120 A | 12/1993 | Eustache et al. | |
| 5,274,316 A | 12/1993 | Evans et al. | |
| 5,280,806 A | 1/1994 | Glazebrook | |
| 5,318,071 A | 6/1994 | Gaiardo | |
| 5,334,819 A | 8/1994 | Lin | |
| 5,345,968 A | 9/1994 | Day | |
| 5,351,934 A | 10/1994 | Jensen et al. | |
| 5,354,965 A | 10/1994 | Lee | |
| 5,383,247 A | 1/1995 | Nickel | |
| 5,423,486 A | 6/1995 | Hunter | |
| 5,467,522 A | 11/1995 | Gold | |
| 5,500,691 A | 3/1996 | Martin et al. | |
| 5,509,606 A | 4/1996 | Breithaupt et al. | |
| 5,553,094 A | 9/1996 | Johnson et al. | |
| 5,561,882 A | 10/1996 | Eustache et al. | |
| 5,636,407 A | 6/1997 | Len | |
| 5,650,080 A | 7/1997 | Koneke | |
| 5,673,360 A | 9/1997 | Scripps | |
| 5,711,486 A | 1/1998 | Clark et al. | |
| 5,711,487 A | 1/1998 | Hommelet | |
| 5,727,118 A | 3/1998 | Roussel et al. | |
| 5,727,769 A | 3/1998 | Suzuki | |
| 5,762,278 A | 6/1998 | Yamaguchi et al. | |
| 5,784,751 A | 7/1998 | Tippets | |
| 5,820,026 A | 10/1998 | Raghu | |
| 5,823,439 A | 10/1998 | Hunter et al. | |
| 5,857,624 A | 1/1999 | Lee | |
| 5,881,428 A | 3/1999 | Simmons | |
| 5,903,953 A | 5/1999 | Dimur et al. | |
| 5,927,608 A | 7/1999 | Scorsiroli | |
| 5,944,910 A | 8/1999 | Fujii | |
| 5,947,348 A | 9/1999 | Briski | |
| 5,957,384 A | 9/1999 | Lansinger | |
| 5,965,950 A | 10/1999 | Park | |
| 5,979,796 A | 11/1999 | Ponziani et al. | |
| 5,988,523 A | 11/1999 | Scott | |
| 5,988,529 A | 11/1999 | Suhring | |
| 6,008,474 A | 12/1999 | Dumas | |
| 6,024,803 A | 2/2000 | Buchanan et al. | |
| 6,029,908 A | 2/2000 | Petzold | |
| 6,032,324 A | 3/2000 | Lansinger | |
| 6,042,023 A | 3/2000 | Ask | |
| 6,050,503 A | 4/2000 | Suhring et al. | |
| 6,077,361 A | 6/2000 | Glenn | |
| 6,082,632 A | 7/2000 | Clark et al. | |
| 6,111,563 A | 8/2000 | Hines | |
| 6,113,006 A | 9/2000 | Walker et al. | |
| 6,133,546 A | 10/2000 | Bains | |
| 6,152,384 A | 11/2000 | Lopez et al. | |
| 6,155,493 A | 12/2000 | Kearby et al. | |
| 6,164,564 A | 12/2000 | Franco et al. | |
| 6,175,688 B1 * | 1/2001 | Cassidy et al. | 392/470 |
| 6,186,156 B1 | 2/2001 | Schlein | |
| 6,199,587 B1 | 3/2001 | Shlomi et al. | |
| 6,220,524 B1 | 4/2001 | Tores et al. | |
| 6,223,951 B1 | 5/2001 | Siegel et al. | |
| 6,236,019 B1 | 5/2001 | Piccione et al. | |
| 6,237,861 B1 | 5/2001 | Northrop et al. | |
| 6,257,500 B1 | 7/2001 | Petzold et al. | |
| 6,265,829 B1 | 7/2001 | Perdec | |
| 6,267,297 B1 | 7/2001 | Contadini et al. | |
| 6,281,649 B1 | 8/2001 | Ouellette et al. | |
| 6,286,174 B1 | 9/2001 | Zimmer | |
| 6,330,497 B1 | 12/2001 | Obradovich et al. | |
| 6,463,621 B1 | 10/2002 | Zimmer et al. | |
| D466,072 S | 11/2002 | Leutz et al. | |
| 6,615,438 B1 | 9/2003 | Franco et al. | |
| 6,626,377 B1 | 9/2003 | Vogt | |
| 6,669,109 B2 | 12/2003 | Ivanov et al. | |
| 6,788,885 B2 * | 9/2004 | Mitsunaga et al. | 392/470 |
| 6,795,645 B2 * | 9/2004 | Hygema et al. | 392/477 |
| 6,892,417 B2 | 5/2005 | Franco et al. | |
| 6,902,118 B2 | 6/2005 | Shank et al. | |
| 6,912,357 B2 * | 6/2005 | Bissonnette et al. | 392/465 |
| 6,944,908 B2 | 9/2005 | Hoetzer et al. | |
| 6,955,306 B2 | 10/2005 | Salvador et al. | |
| 7,171,716 B2 | 2/2007 | Franco et al. | |
| 7,190,893 B2 * | 3/2007 | Kuebler et al. | 392/485 |
| 7,445,165 B2 | 11/2008 | Franco et al. | |
| 7,977,606 B2 * | 7/2011 | Adachi et al. | 219/202 |
| 2002/0026999 A1 | 3/2002 | Wu et al. | |
| 2002/0137455 A1 | 9/2002 | Ivanov et al. | |
| 2004/0045587 A1 | 3/2004 | Franco et al. | |
| 2004/0112981 A1 | 6/2004 | Ivanov et al. | |
| 2004/0170410 A1* | 9/2004 | Gamboa et al. | 392/484 |
| 2005/0086758 A1 | 4/2005 | Arkashevski et al. | |
| 2005/0177969 A1 | 8/2005 | Franco et al. | |
| 2006/0102744 A1 | 5/2006 | Arkashevski et al. | |
| 2006/0124761 A1 | 6/2006 | Shank et al. | |
| 2008/0203188 A1 | 8/2008 | Arkashevski et al. | |
| 2009/0014035 A1 | 1/2009 | Franco et al. | |

FOREIGN PATENT DOCUMENTS

| | | |
|---|---|---|
| DE | 36 34 404 | 11/1987 |
| EP | 0 104 673 | 4/1984 |
| EP | 0 456 934 | 11/1991 |
| EP | 0 745 523 | 12/1996 |
| EP | 0 989 937 | 12/1998 |
| EP | 1022936 | 6/2004 |
| GB | 370 687 | 4/1932 |
| GB | 1 451 666 | 10/1976 |
| JP | 59 011949 | 5/1984 |
| JP | 63093652 | 4/1988 |
| JP | 2053656 | 2/1990 |

| | | |
|---|---|---|
| JP | 2234866 | 9/1990 |
| JP | 07 223510 | 8/1995 |
| JP | 08 312824 | 11/1996 |
| JP | 11 211821 | 8/1999 |
| JP | 2000177538 | 8/2000 |
| WO | WO 96/11350 | 4/1996 |
| WO | WO 97/46431 | 12/1997 |
| WO | WO 98/58826 | 12/1998 |
| WO | WO 00/15479 | 3/2000 |
| WO | WO 00/48878 | 8/2000 |
| WO | WO 02/092237 | 11/2002 |
| WO | WO 2008/012801 | 1/2008 |

OTHER PUBLICATIONS

Microfilm of Japanese Utility Model Application No. 11507/1971 (Japanese Utility Model Laid-Open No. 9123/1972).
Japanese Patent Laid-Open No. 142262/1997. Abstract.
Microfilm of Japanese Utility Model Application No. 136431/1986 (Japanese Utility Model Laid-Open No. 43861/1988).
Microfilm of Japanese Utility Model Application No. 133987/1973 (Japanese Utility Model Laid-Open No. 77934/1975).

* cited by examiner

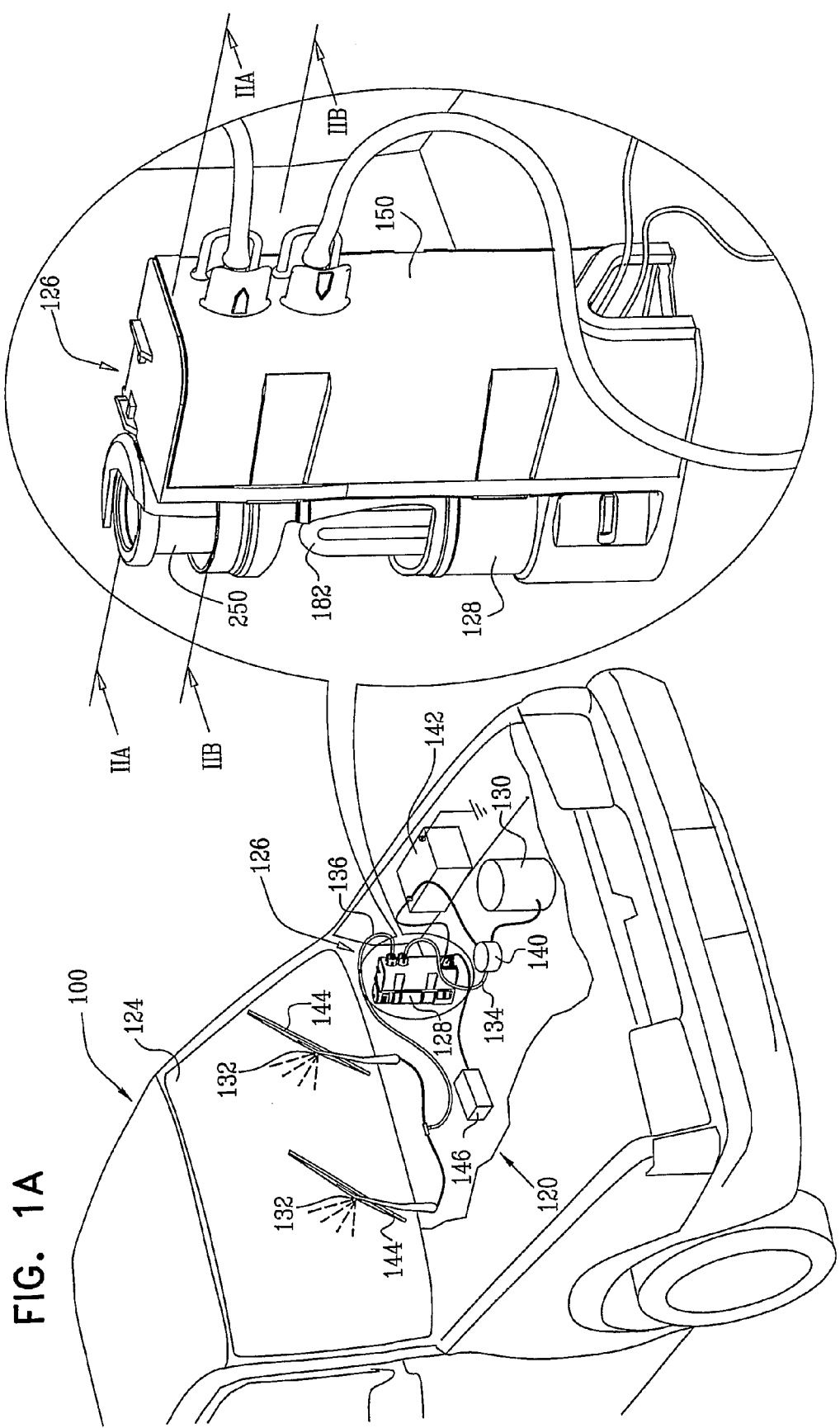

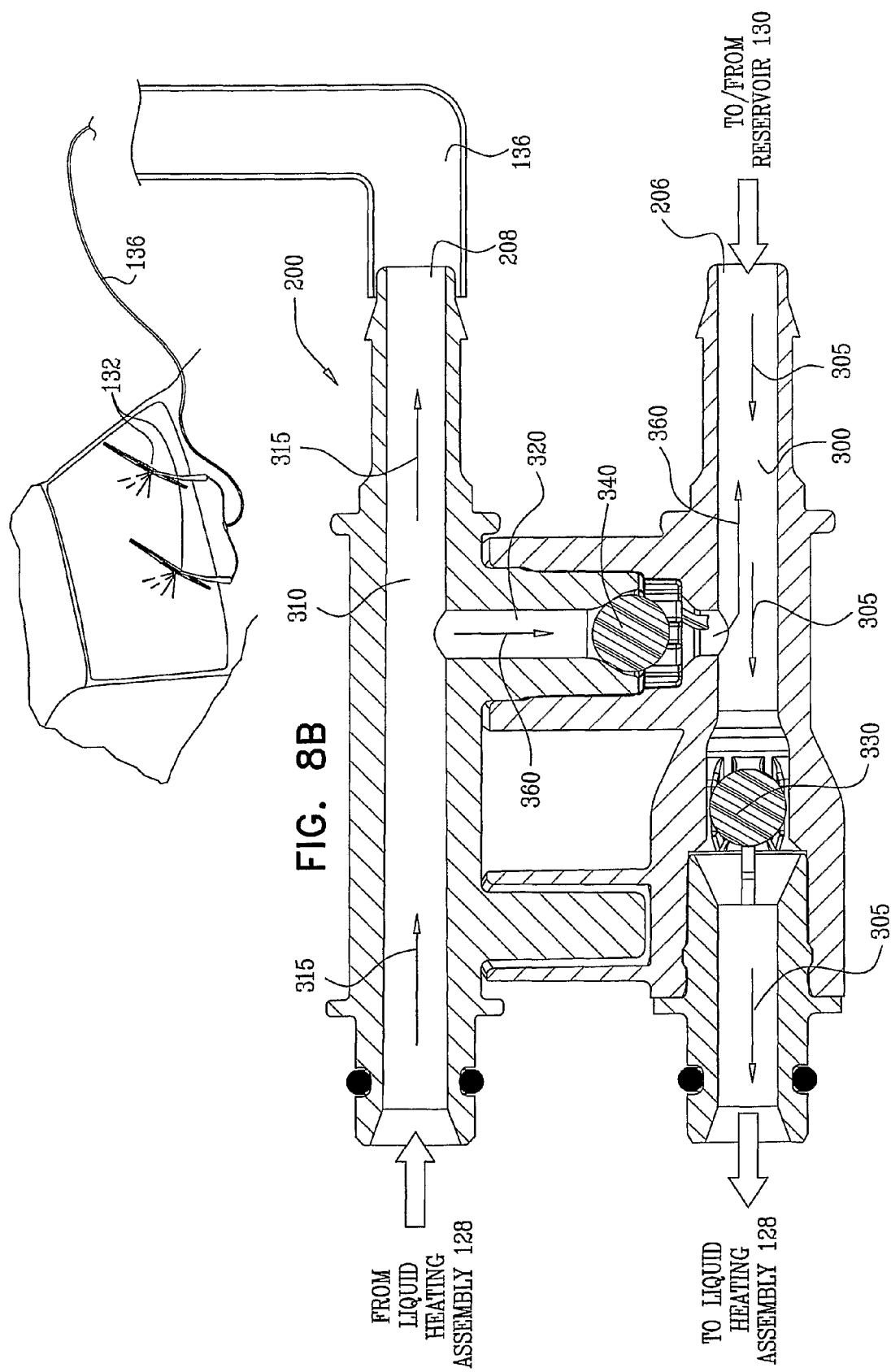

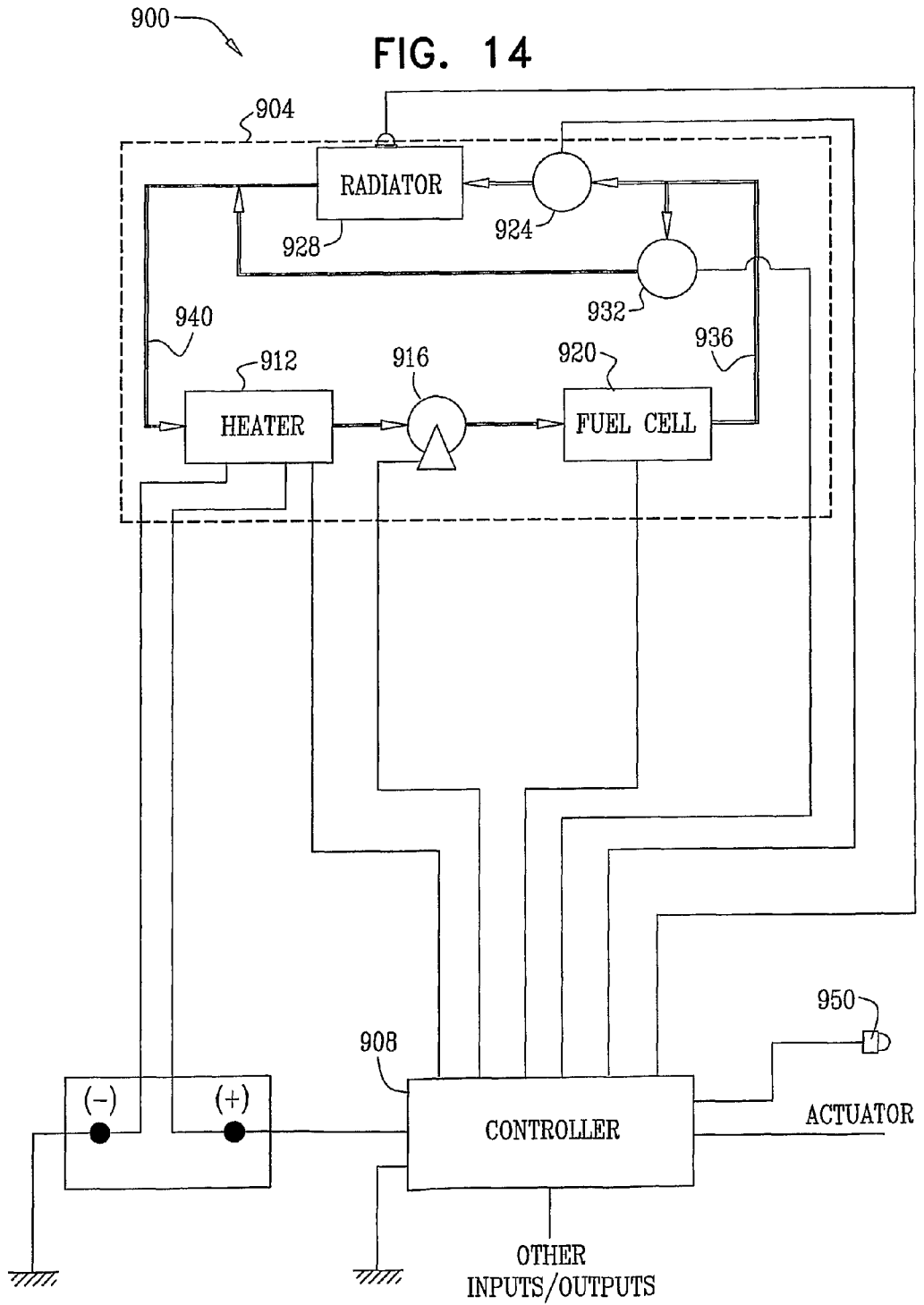

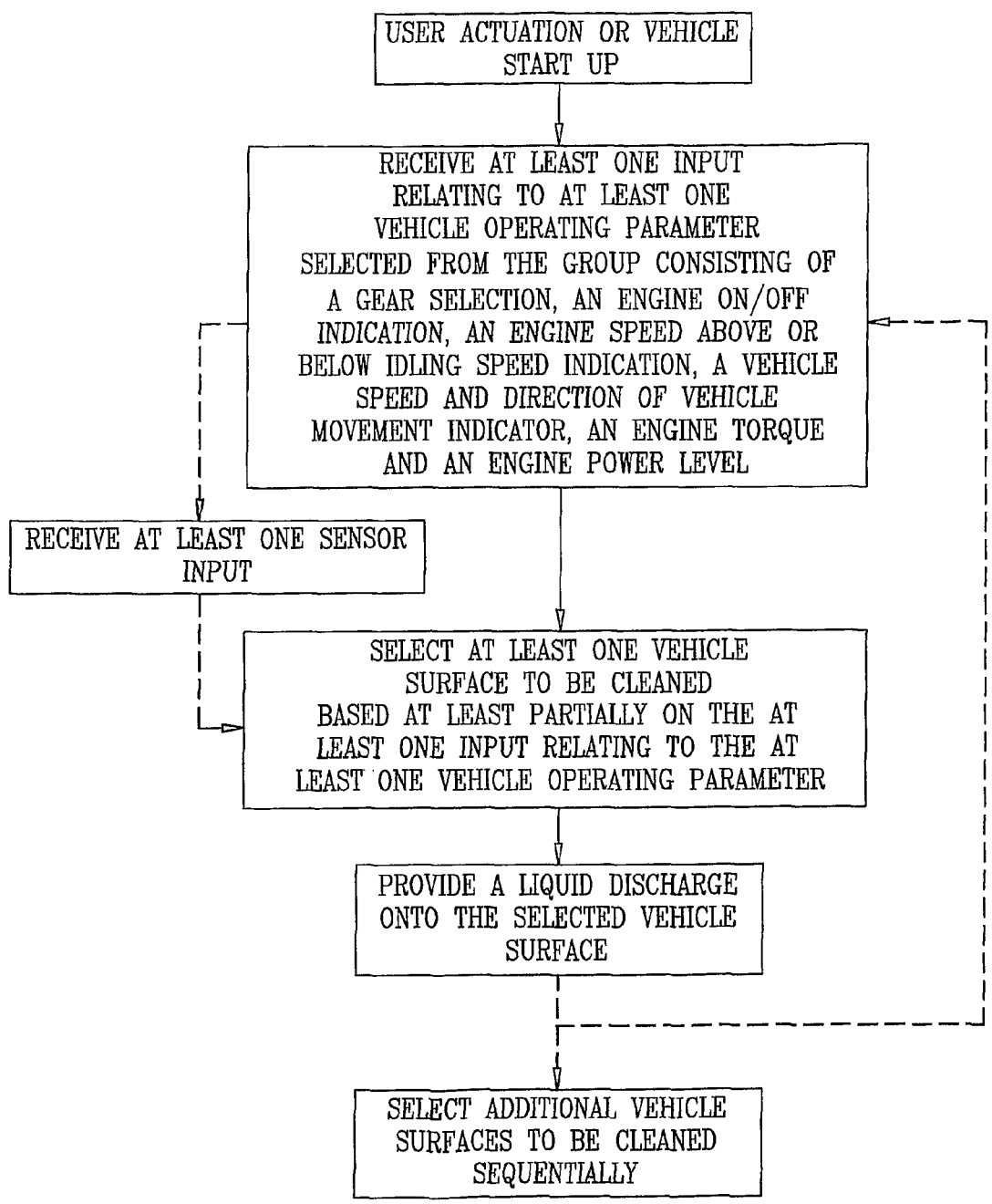

VEHICLE SURFACES CLEANING AND DE-ICING SYSTEM AND METHOD

CROSS REFERENCE TO PRIOR APPLICATIONS

This is the U.S. National Phase application under 35 U.S.C. §371 of International Patent Application No. PCT/IL2007/000910, filed Jul. 18, 2007, and claims the benefit of U.S. Provisional Application Nos. 60/833,115, filed Jul. 24, 2006; 60/833,056, filed Jul. 24, 2006; and 60/836,734, filed Aug. 9, 2006 all of which are incorporated by reference herein. The International Application published in English on Jan. 31, 2008 as WO 2008/012801 under PCT Article 21(2).

REFERENCE TO RELATED APPLICATIONS

Reference is made to U.S. Provisional Patent Application Ser. No. 60/833,056, filed Jul. 24, 2006 and entitled "Washer Fluid Heating System," U.S. Provisional Patent Application Ser. No. 60/833,115, filed Jul. 24, 2006 and entitled "Washer Fluid Heating System" and U.S. Provisional Patent Application Ser. No. 60/836,734, filed Aug. 7, 2006 and entitled "Liquid Heating System," the disclosures of which are hereby incorporated by reference and priority of which are hereby claimed pursuant to 37 CFR 1.78(a) (4) and (5)(i).

Reference is made to applicants' copending PCT Application Serial No. PCT/IL2006/001209 filed Oct. 19, 2006, the disclosure of which is hereby incorporated by reference.

Reference is made to applicants' copending U.S. patent application Ser. No. 10/700,141 filed Nov. 3, 2003, the disclosure of which is hereby incorporated by reference. Reference is made to applicants' copending U.S. patent application Ser. No. 11/610,287 filed Dec. 13, 2006, the disclosure of which is hereby incorporated by reference.

Reference is made to applicants' copending U.S. patent application Ser. No. 10/477,486 filed Jun. 21, 2004, the disclosure of which is hereby incorporated by reference. Reference is made to applicants' copending U.S. patent application Ser. No. 10/531,979 filed Oct. 21, 2005, the disclosure of which is hereby incorporated by reference.

Reference is made to applicants' copending U.S. patent application Ser. No. 10/588,165 filed Feb. 11, 2005, the disclosure of which is hereby incorporated by reference.

Reference is made to applicants'/assignee's U.S. Pat. Nos. 6,164,564; 6,615,438; 6,669,109; 6,892,417; 7,108,754 and 7,171,716, the disclosures of which are hereby incorporated by reference.

FIELD OF THE INVENTION

The present invention relates generally to apparatus and methods for heating liquid for use in cleaning or de-icing vehicle elements.

BACKGROUND OF THE INVENTION

The following publications are believed to represent the current state of the art:

U.S. Pat. Nos. 653,629; 1,636,190; 2,607,944; 3,202,447; 3,203,447; 3,319,891; 3,332,045; 3,446,942; 3,427,675; 3,475,588; 3,632,042; 3,524,044; 3,537,900; 3,643,193; 3,711,679; 3,716,886; 3,747,500; 3,888,412; 3,977,436; 3,979,068; 4,090,668; 4,088,269; 4,106,508; 4,159,026; 4,212,425; 4,253,493; 4,295,111; 4,306,589; 4,403,765; 4,489,863; 4,508,957; 4,524,797; 4,534,539; 4,561,632; 4,574,841; 4,616,780; 4,638,525; 4,690,371; 4,815,662; 4,834,289; 4,877,186; 4,832,262; 4,922,570; 4,946,009; 4,999,550; 5,012,977; 5,034,714; 5,118,040; 5,134,266; 5,141,157; 5,141,160; 5,173,586; 5,203,049; 5,254,083; 5,271,120; 5,318,071; 5,345,968; 5,351,934; 5,354,965; 5,383,247; 5,423,486; 5,467,522; 5,509,606; 5,561,882; 5,636,407; 5,650,080; 5,673,360; 5,711,486; 5,711,487; 5,727,769; 5,762,278; 5,784,751; 5,823,439; 5,881,428; 5,903,953; 5,927,608; 5,944,910; 5,947,348; 5,957,384; 5,965,950; 5,979,796; 5,988,523; 5,988,529; 6,008,474; 6,024,803; 6,029,908; 6,032,324; 6,050,503; 6,082,632; 6,133,546; 6,164,564; 6,155,493; 6,199,587; 6,220,524; 6,223,951; 6,236,019; 6,257,500; 6,281,649; 6,286,174; 6,330,497; 6,781,056; 6,841,739; 6,896,199; 6,615,438; 6,669,109; 6,892,417; 7,108,754 and 7,171,716.

Published PCT Applications: WO 2007/046106, WO 2005/076735, WO 2004/035358, WO 02/092237, WO 00/27540 and WO 98/58826.

SUMMARY OF THE INVENTION

The present invention seeks to provide improved apparatus and methods for heating liquid for use in cleaning or de-icing vehicle surfaces.

There is thus provided in accordance with a preferred embodiment of the present invention a liquid heating unit for use in a vehicle surface cleaning and deicing system, the liquid heating unit including a liquid heating assembly, having an inlet through which a washing fluid is received from a reservoir and an outlet through which the fluid is discharged for cleaning at least one vehicle surface, at least one heating element for heating fluid in the liquid heating assembly and a freeze protection element located in the liquid heating assembly, the freeze protection element including a deformable container being deformable in at least two generally perpendicular axial directions.

Preferably, the container defines an interior volume and the container is inwardly deformable into the interior volume. Additionally or alternatively, the container includes a generally cylindrical container. Additionally or alternatively the freeze protection element also includes a sealing element.

Preferably, the freeze protection element is formed of a flexible material. Additionally or alternatively, the freeze protection element is formed of a resilient material.

Preferably, the freeze protection element is operative to generally prevent fluid from passing therethrough. Additionally or alternatively, the container is deformable in three generally perpendicular axial directions.

There is also provided in accordance with another preferred embodiment of the present invention a vehicle surface cleaning and deicing system including at least one vehicle surface sprayer, a reservoir, a liquid heating assembly, having an inlet through which a washing fluid is received from the reservoir and an outlet through which the fluid is supplied to the at least one vehicle surface sprayer for spraying onto at least one vehicle surface, at least one heating element for heating fluid in the liquid heating assembly and a manifold in fluid communication with the at least one vehicle surface sprayer, the reservoir and the liquid heating assembly, the manifold including an input conduit along a first fluid flow path connecting the reservoir and the liquid heating assembly, an output conduit along a second fluid flow path connecting the liquid heating assembly and the at least one vehicle surface sprayer, a connecting conduit connecting the input conduit and the output conduit, a first one-way valve located along the first flow path operative to allow fluid flow from the reservoir to the liquid heating assembly and a second one-way valve located along the connecting conduit operative to permit flow from the output conduit to the input conduit.

Preferably, the manifold also includes an additional connecting conduit connecting the input conduit and the output conduit and a third one-way valve located along the additional connecting conduit operative to permit flow from the input conduit to the output conduit. Alternatively or additionally, the first one-way valve is a pressure operated one-way valve. Additionally or alternatively, the second one-way valve is a pressure operated one-way valve. Additionally or alternatively, the vehicle surface cleaning and deicing system also includes at least one additional one-way valve located along the second fluid flow path upstream of the manifold and downstream of the at least one vehicle surface sprayer.

Preferably, the manifold is suitable for use both in vehicles that include at least one additional one-way valve, located along the second fluid flow path upstream of the manifold and downstream of the at least one vehicle surface sprayer, and vehicles that do not include the at least one additional one-way valve.

There is yet further provided in accordance with still another preferred embodiment of the present invention a liquid heater including a housing defining an liquid inlet and a liquid outlet and at least one heating element disposed in the housing, the housing and the at least one heating element defining at least one liquid flow path between the inlet and the outlet, the at least one heating element operative to heat liquid flowing through the housing along the at least one liquid flow path, the at least one heating element including a circuit board substrate, at least one electrical circuit formed on the circuit board substrate and at least one heating trace formed over at least a portion of the at least one electrical circuit.

Preferably, the at least one heating trace and the at least one electrical circuit are formed of the same material. Alternatively, the at least one heating trace and the at least one electrical circuit are formed of different materials. Additionally or alternatively, the at least one heating trace is formed of a composite material.

Preferably, the at least one heating trace includes at least one serpentine heating trace.

There is even further provided in accordance with yet another preferred embodiment of the present invention a method for supplying liquid for use in cleaning at least one of a plurality of vehicle surfaces, the method including receiving at least one input relating to at least one vehicle operating parameter selected from the group consisting of a gear selection, an engine on/off indication, an engine speed above or below idling speed indication, a vehicle speed and direction of vehicle movement indicator, an engine torque and an engine power level, selecting at least one vehicle surface of the plurality of vehicle surfaces based at least partially on the at least one input relating to the at least one vehicle operating parameter and discharging the liquid through an outlet onto the at least one vehicle surface selected.

Preferably, the selecting at least one vehicle surface includes selecting multiple vehicle surfaces and selecting a sequential order for discharging the liquid onto the multiple vehicle surfaces and the discharging includes discharging the liquid onto the multiple vehicle surfaces in the sequential order. Additionally, the discharging the liquid onto the multiple vehicle surfaces in the sequential order includes initiating at least one discharge in the sequential order prior to the completion of the previous discharge in the sequential order.

Alternatively, the selecting at least one vehicle surface includes selecting multiple vehicle surfaces and the discharging includes discharging the liquid onto the multiple vehicle surfaces at least partially simultaneously. Alternatively, the method also includes at least one additional iteration of the receiving, the selecting and the discharging.

Preferably, the method also includes heating the liquid prior to the discharging. Additionally or alternatively, the method also includes selecting a liquid source for the liquid prior to the discharging.

Preferably, the selecting also includes receiving at least one sensor input from at least one sensor and selecting the at least one vehicle surface based at least partially on the at least one sensor input. Additionally, the at least one sensor includes at least one sensor selected from the group consisting of a dirt sensor, a temperature sensor, a liquid level sensor, a wind speed sensor and a rain sensor.

There is also provided in accordance with yet another preferred embodiment of the present invention a system for supplying liquid for use in cleaning at least one of a plurality of vehicle surfaces, the system including a liquid reservoir, at least one liquid outlet in fluid communication with the liquid reservoir, a pump, and a controller operative to receive at least one input relating to at least one vehicle operating parameter, to select at least one vehicle surface of the plurality of vehicle surfaces based at least partially on the at least one input relating to at least one vehicle operating parameter and to provide an input to the pump to provide a discharge of the liquid through the liquid outlet onto the at least one vehicle surface selected, the at least one vehicle operating parameter being selected from the group consisting of a gear selection, an engine on/off indication, an engine speed above or below idling speed indication, a vehicle speed and direction of vehicle movement indicator, an engine torque and an engine power level.

There is further provided in accordance with still another preferred embodiment of the present invention a method for supplying liquid for use in cleaning multiple vehicle surfaces of a plurality of vehicle surfaces, the method comprising receiving at least one input relating to at least one vehicle operating parameter, selecting said multiple vehicle surfaces based at least partially on said at least one input relating to said at least one vehicle operating parameter and selecting a sequential order for discharging said liquid onto said multiple vehicle surfaces and discharging said liquid through an outlet onto said multiple vehicle surfaces in said sequential order.

BRIEF DESCRIPTION OF THE DRAWINGS

The present invention will be understood and appreciated more fully from the following detailed description, taken in conjunction with the drawings in which:

FIG. 1A is a simplified pictorial illustration of a vehicle surface cleaning and de-icing system, constructed and operative in accordance with a preferred embodiment of the present invention, installed in a vehicle;

FIGS. 8A and 8B are simplified sectional illustrations of the manifold of FIGS. 1A-2B and 7, taken along lines VIII-VIII of FIG. 1B;

FIG. 14 is a simplified schematic illustration of a system for heating liquid for use by a vehicle fuel cell, constructed and operative in accordance with another preferred embodiment of the present invention;

FIG. 16 is a simplified flow chart of a preferred mode of operation of a vehicle surface cleaning and de-icing system of FIGS. 15A and 15B.

DETAILED DESCRIPTION OF PREFERRED EMBODIMENTS

It is appreciated that the term "vehicle" as used in the context of the present patent application and in the claims can refer to any type of wheeled vehicle having windows or any other interior or exterior surface requiring cleaning and/or de-icing, such as an automobile or a truck, as well as a boat or an airplane.

It is also appreciated that, even though the present invention is shown in the context of a windshield cleaning and de-icing system, the systems and methods of the present invention can be utilized to clean and/or de-ice any interior or exterior vehicle surface including, for example, front and/or rear windshields, mirrors, windows, headlights, tail lights, radar, radome. It is further appreciated that the cleaning and de-icing system of the present invention may also be used to clean and/or de-ice any vehicle surface that transmits or receives energy, such as, but not limited to, visible light, infrared light, RF energy and UV energy.

It is appreciated that the terms "cleaning" and "de-icing" as used in the context of the present patent application and in the claims are used interchangeably to refer to apparatus, systems and methods for removing ice, snow and/or any other foreign matter from vehicle interior or exterior surfaces requiring cleaning and/or de-icing.

It is appreciated that the terms "non heat conductive material" and "heat conductive material" as used in the context of the present patent application and in the claims, refers to materials which are known in the art to be relatively poor heat conductors and relatively good heat conductors, respectively. It is appreciated that the terms "non electrically conductive material" and "electrically conductive material" as used in the context of the present patent application and in the claims, refers to materials which are known in the art to be relatively poor conductors of electricity and relatively good conductors of electricity, respectively.

It is appreciated that the term "controller", as used in context of the present patent application and in the claims, may refer to a controller which forms part of the vehicle surface cleaning and de-icing system of the present invention, or to a vehicle computer or computers or to any combination thereof. The controller may be in communication with a vehicle computer or computers and one or more sensors, as described further hereinbelow.

Figure 1B:
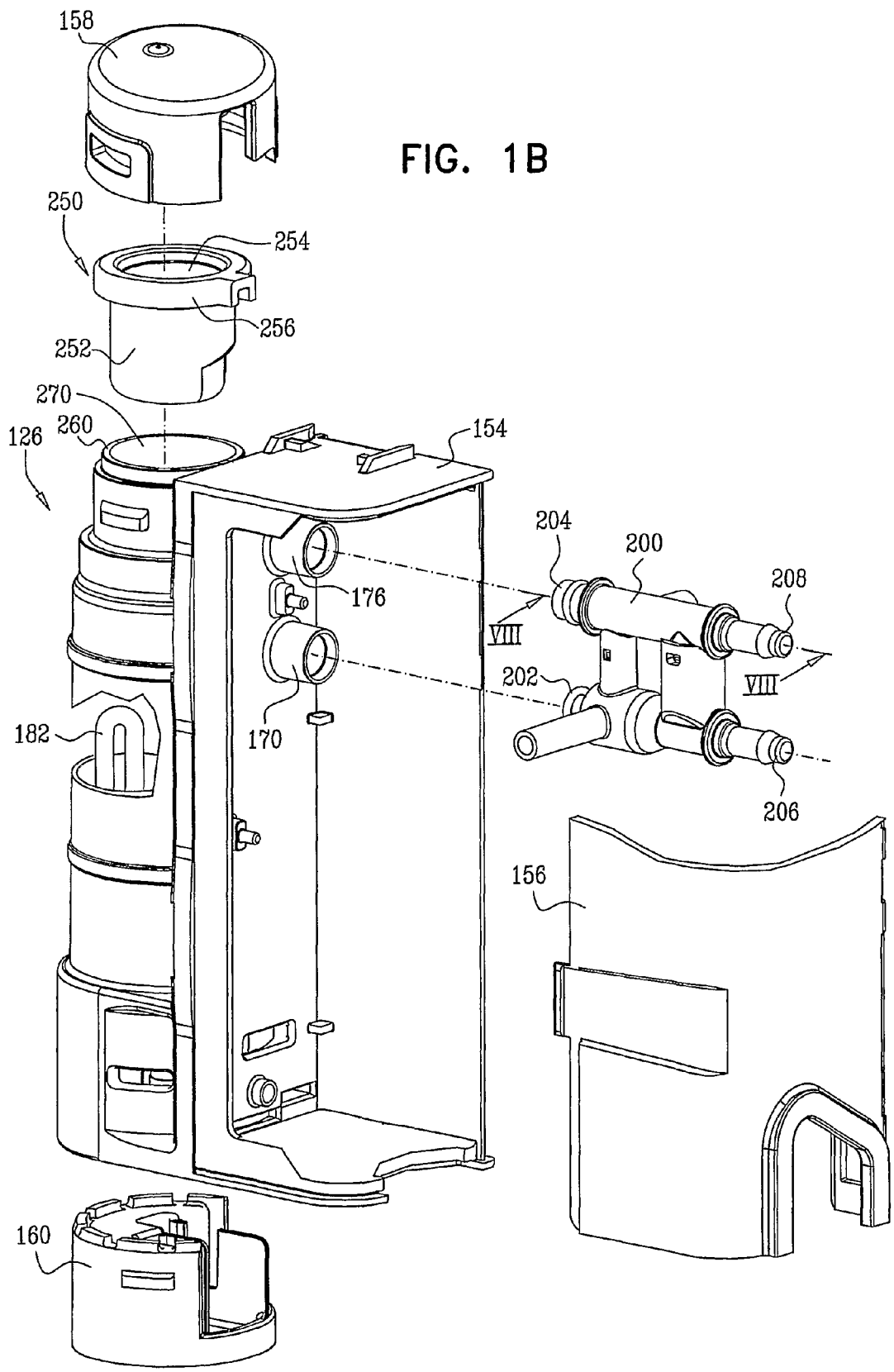
FIG. 1B is a simplified exploded view pictorial illustration of the liquid heating unit forming part of the vehicle surface cleaning and de-icing system of FIG. 1A.
Figure 2A:
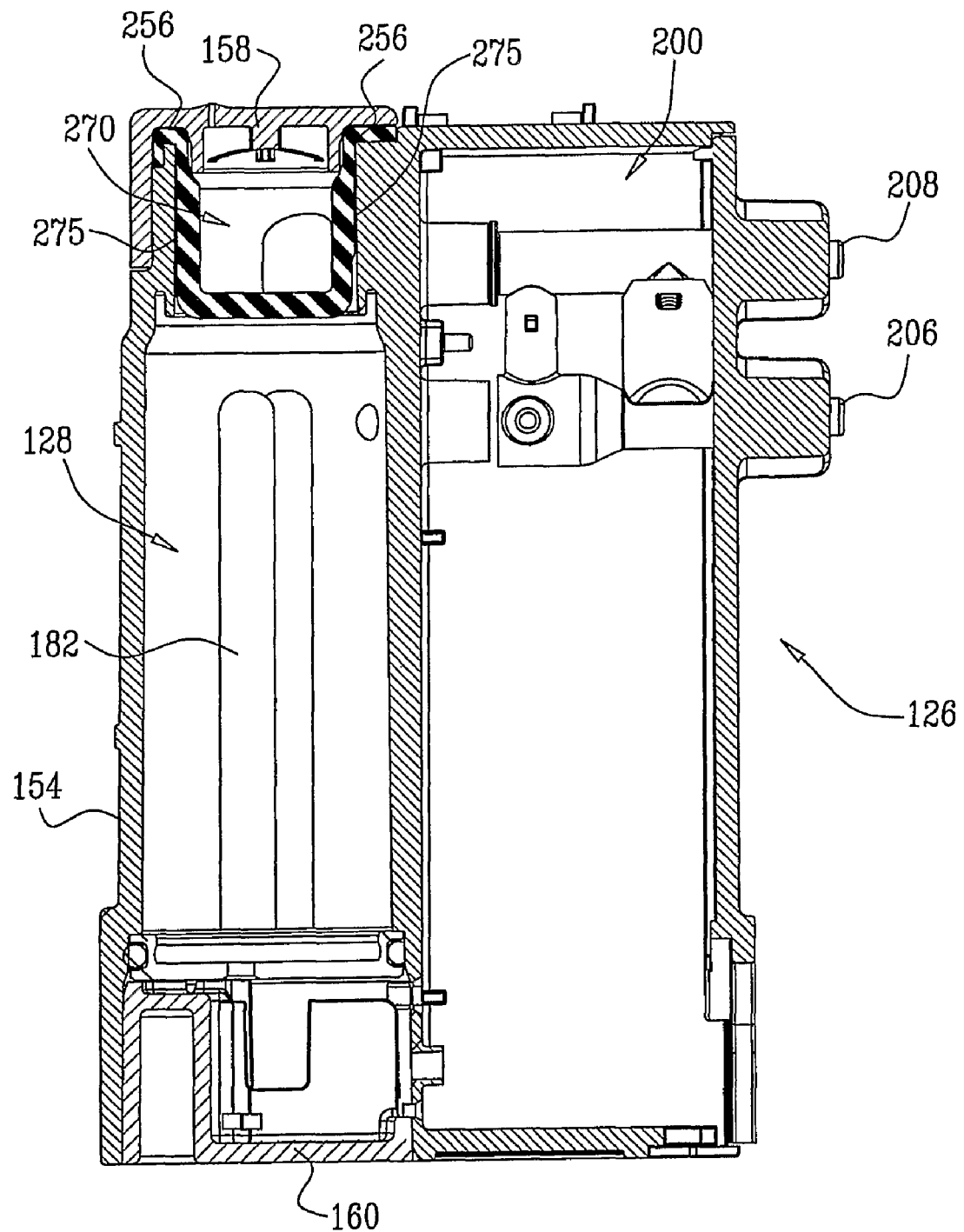
FIGS. 2A and 2B are simplified sectional illustrations of the liquid heating unit of FIGS. 1A and 1B, taken along lines IIA-IIA and IIB-IIB of FIG. 1A, respectively.
Figure 2B:
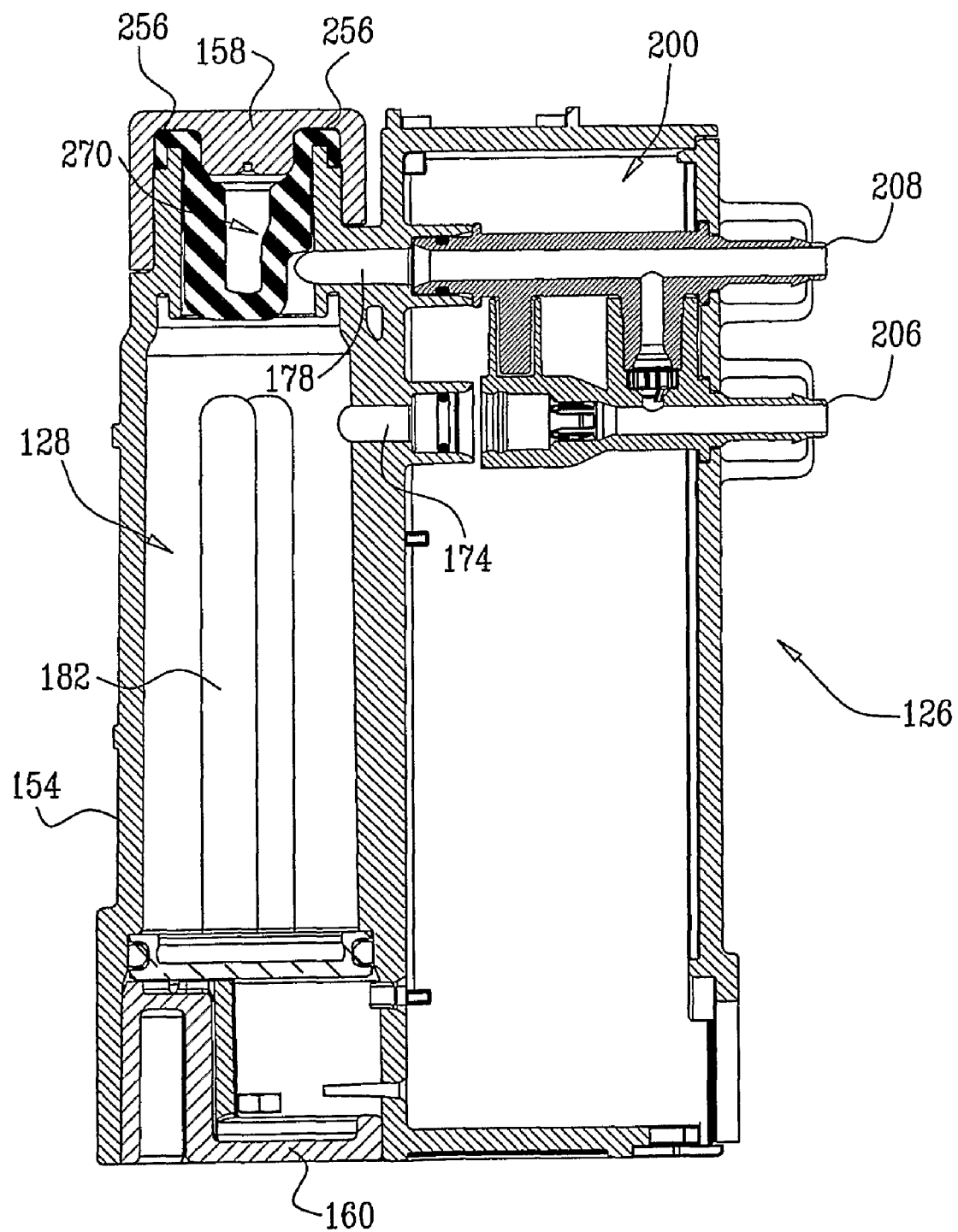

Reference is now made to FIG. 1A, which is a simplified pictorial illustration of a vehicle surface cleaning and de-icing system, constructed and operative in accordance with a preferred embodiment of the present invention, installed in a vehicle, FIG. 1B, which is a simplified exploded view pictorial illustration of a liquid heating unit forming part of the vehicle surface cleaning and de-icing system of FIG. 1A, and to FIGS. 2A and 2B, which are simplified sectional illustrations of the liquid heating unit of FIGS. 1A and 1B.

As seen in FIG. 1A, an otherwise conventional vehicle 100 is seen to incorporate a vehicle surface cleaning and de-icing system 120 for cleaning and/or de-icing a vehicle surface, such as a windshield 124. The vehicle surface cleaning and de-icing system 120 preferably includes a liquid heating unit 126, including a liquid heating assembly 128, for heating liquid received from a reservoir 130, which provides heated liquid, such as water or windshield cleaning liquid, to at least one sprayer 132 for spraying onto windshield 124. Liquid heating unit 126 has an inlet 134, which receives liquid from reservoir 130, and an outlet 136 through which heated liquid is discharged to at least one sprayer 132. The liquid is driven by a pump 140, which is generally already present in vehicle 100 for spraying unheated liquid to clean windshield 124.

A battery 142 provides power to vehicle surface cleaning and de-icing system 120, and wipers 144 clean melted ice and dirt from the windshield 124, as is known in the art. A controller 146 regulates the operation of vehicle surface cleaning and de-icing system 120, and optionally also controls wipers 144 in conjunction with operation of vehicle surface cleaning and de-icing system 120.

One or more temperature sensors, in communication with controller 146, are preferably provided to measure the temperature of the liquid in liquid heating assembly 128 and may also measure the temperature of the at least one sprayer 132. Additionally, one or more temperature sensors, preferably in communication with controller 146, may be provided to measure the temperature external to liquid heating assembly 128, such as a windshield temperature sensor (not shown), a vehicle exterior temperature sensor (not shown) and a vehicle interior temperature sensor (not shown).

It is appreciated that at least one sprayer 132, which is located on a wiper arm in the illustrated embodiment, may be located in any other suitable location, such as adjacent windshield 124 or on wipers 144.

Additional sensors may also be provided, such as a wind speed sensor or a dirt sensor. Controller 146 may also be operative to receive additional inputs concerning vehicle operational parameters and/or external conditions from a vehicle computer and/or from existing vehicle sensors.

As seen further in FIGS. 1B, 2A and 2B, liquid heating unit 126 comprises a housing 150 including a main housing portion 154, a removable cover housing portion 156, a first cap portion 158 and a second cap portion 160.

Main housing portion 154 preferably defines a first manifold engagement surface 170 defining a liquid inlet aperture 174 and a second manifold engagement surface 176 defining a liquid outlet aperture 178.

Main housing portion 154 also preferably defines an interior volume in which is disposed liquid heating assembly 128. At least one heating element 182 is disposed within liquid heating assembly 128 for heating liquid therein. As seen particularly in FIG. 2B, liquid inlet aperture 174 and liquid outlet aperture 178 are both in fluid communication with liquid heating assembly 128 and a manifold 200.

It is appreciated that liquid heating assembly 128 may be any liquid heating assembly suitable for use in a vehicle, including but not limited to those described in applicants'/assignee's U.S. Pat. Nos. 6,164,564; 6,615,438; 6,669,109; 6,892,417; 7,108,754 and 7,171,716, applicants'/assignee's U.S. patent application Ser. Nos. 11/610,287; 10/700,141; 10/477,486; 10/588,165 and 10/531,979 and applicants'/assignee's PCT Application Serial No. PCT/IL2006/001209, the disclosures of which are hereby incorporated by reference.

Manifold 200 is preferably configured, at one end thereof, to engage first manifold engagement surface 170 and second manifold engagement surface 176 via connectors 202 and 204, respectively. At an opposite end of manifold 200 are provided an inflow connector 206, for connecting to inlet 134, providing liquid from reservoir 130, and an outflow connector 208, for connecting to an outlet 136 providing liquid to at least one sprayer 132. Liquid is preferably supplied to liquid heating assembly 128 from reservoir 130 via inlet 134, manifold 200 and liquid inlet aperture 174. Liquid is preferably provided from liquid heating assembly 128 to at least one sprayer 132 via liquid outlet aperture 178, manifold 200 and outlet 136.

Liquid heating unit 126 also preferably includes a freeze protection element 250 to prevent damage to housing 150 and liquid heating assembly 128 in the event of freezing of liquid within liquid heating unit 126. Freeze protection element 250 is preferably formed of a flexible, resilient material, such as silicon or rubber. In the event of expansion of the liquid in liquid heating assembly 128 due to freezing, freeze protection element 250 is operative to deform inwardly, as described further hereinbelow in reference to FIGS. 5-6B, and thereby prevent damage to liquid heating unit 126.

Freeze protection element 250 preferably comprises a generally cylindrical container portion 252 defining an interior volume 254. Freeze protection element 250 also preferably includes a generally annular sealing element 256 configured to engage an upper surface 260 of main housing portion 154.

As seen in FIGS. 2A and 2B, freeze protection element 250 is preferably inserted into a volume 270 defined in main housing portion 154 above liquid heating assembly 128. Freeze protection element 250 is preferably in sealing engagement with an interior surface 275 of main housing portion 154 to prevent liquid passage from liquid heating assembly 128 into interior volume 254. First cap portion 158 preferably engages main housing portion 154 and is operative to prevent sealing element 256 from disengaging with upper surface 260 of main housing portion 154.

Figure 3:
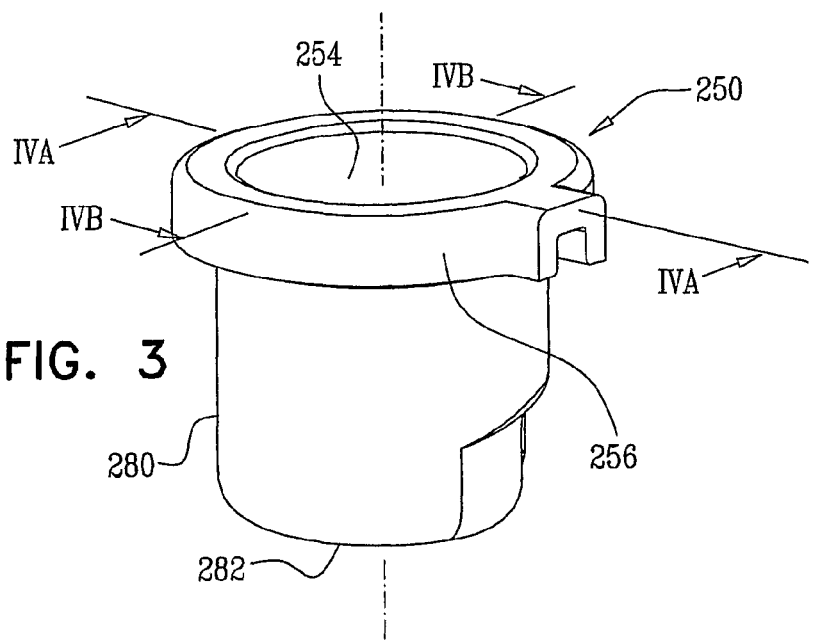
FIG. 3 is a simplified pictorial illustration of a freeze protection element for use in the liquid heating unit of FIGS. 1A-2B.
Figure 4A:
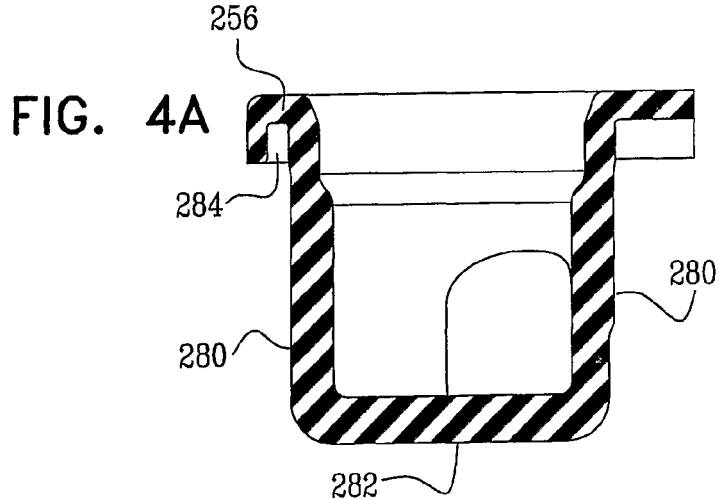
FIGS. 4A and 4B are simplified sectional illustrations of the freeze protection element of FIG. 3, taken along lines IVA-IVA and IVB-IVB of FIG. 3, respectively.
Figure 4B:
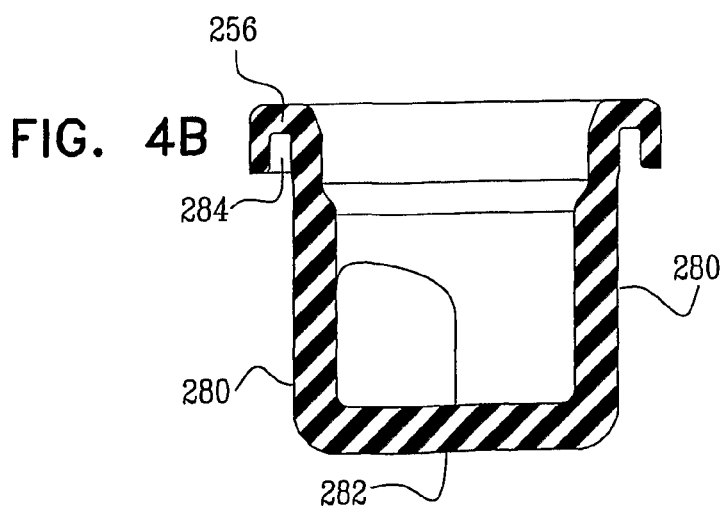

Reference is now made to FIG. 3, which is a simplified pictorial illustration, and to FIGS. 4A and 4B, which are simplified sectional illustrations, of a preferred embodiment of freeze protection element 250 of FIGS. 1A-2B.

As seen in FIGS. 3, 4A and 4B, freeze protection element 250 preferably comprises an integrally formed, generally cylindrical wall portion 280, a generally circular bottom portion 282 and generally annular sealing element 256. Freeze protection element 250 is preferably formed of a flexible, resilient material and is configured to be inwardly deformable when pressure is applied to circular floor portion 282 from below.

As seen particularly in FIGS. 4A-4B, annular sealing element 256 is preferably formed with an overhang 284 configured to engage upper surface 260 of main housing portion 154. Sealing element 256 is operative to generally maintain freeze protection element 250 in proper orientation within volume 270.

Figure 5:
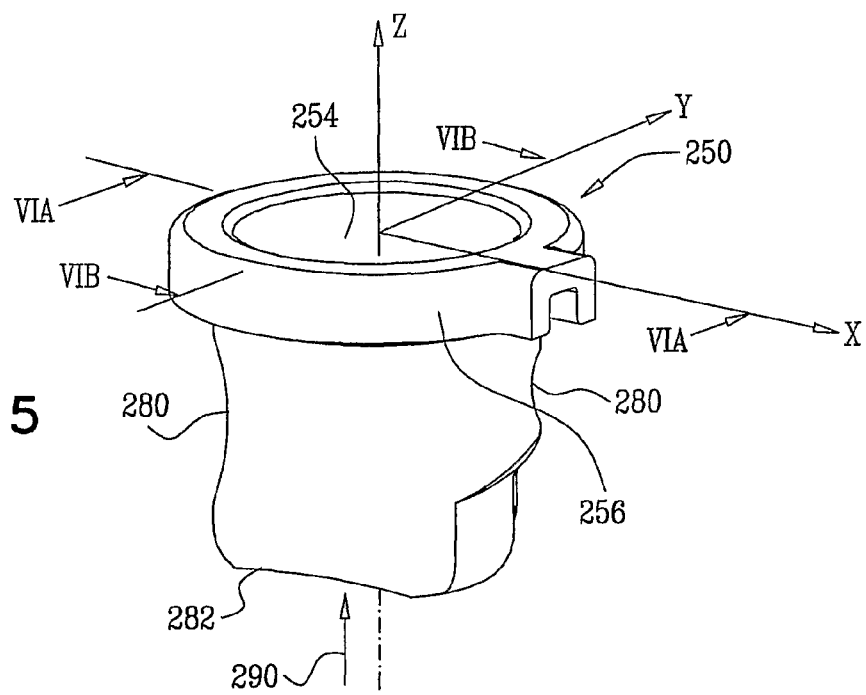
FIG. 5 is a simplified pictorial illustration of a freeze protection element of FIG. 3 in a deformed state.
Figure 6A:
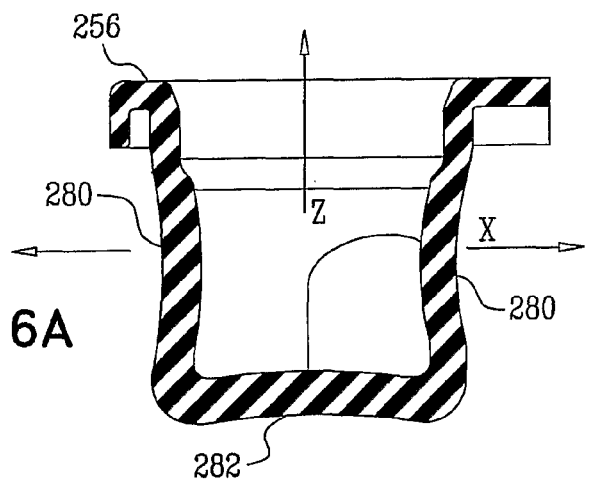
FIGS. 6A and 6B are simplified sectional illustrations of the freeze protection element of FIG. 5, taken along lines VIA-VIA and VIB-VIB of FIG. 5, respectively.
Figure 6B:
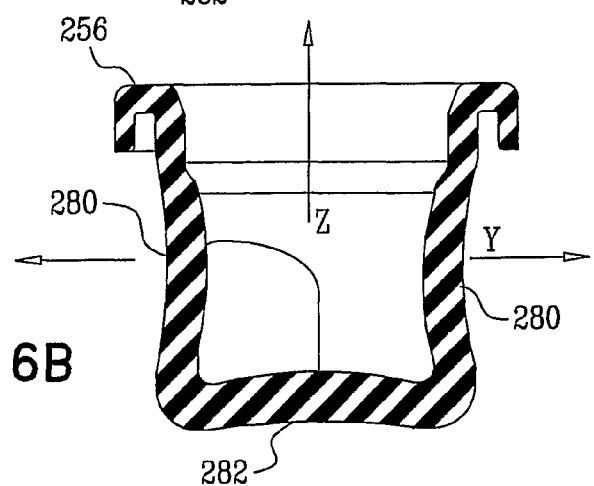

Reference is now made to FIG. 5, which is a simplified pictorial illustration, and to FIGS. 6A and 6B, which are simplified sectional illustrations, of the freeze protection element 250 of FIGS. 1A-4B in a deformed state.

As seen in FIG. 5, when pressure is applied to an outer surface of generally circular bottom portion 282 of freeze protection element 250 from outside freeze protection element 250, such as may be caused by freezing of liquid in liquid heating assembly 128, as indicated by arrow 290, freeze protection element 250 is operative to deform inwardly into interior volume 254. Freeze protection element 250 is preferably operative to deform inwardly in at least two perpendicular axial directions, and may be deformable is all three axial directions.

As seen further in FIGS. 6A and 6B, cylindrical wall portion 280 of freeze protection element 250 may deform inwardly along both an X axis, as seen in FIG. 6A, and along a Y axis, as seen in FIG. 6B. Circular bottom portion 282 may also deform inwardly along a Z axis. It is appreciated that the flexible and resilient properties of freeze protection element 250 enable freeze protection element 250 to simultaneously deform along multiple axes. It is also appreciated that the provision of interior volume 254 of freeze protection element 250 enables freeze protection element 250 to deform inwardly generally without any outward deformation.

Figure 7:
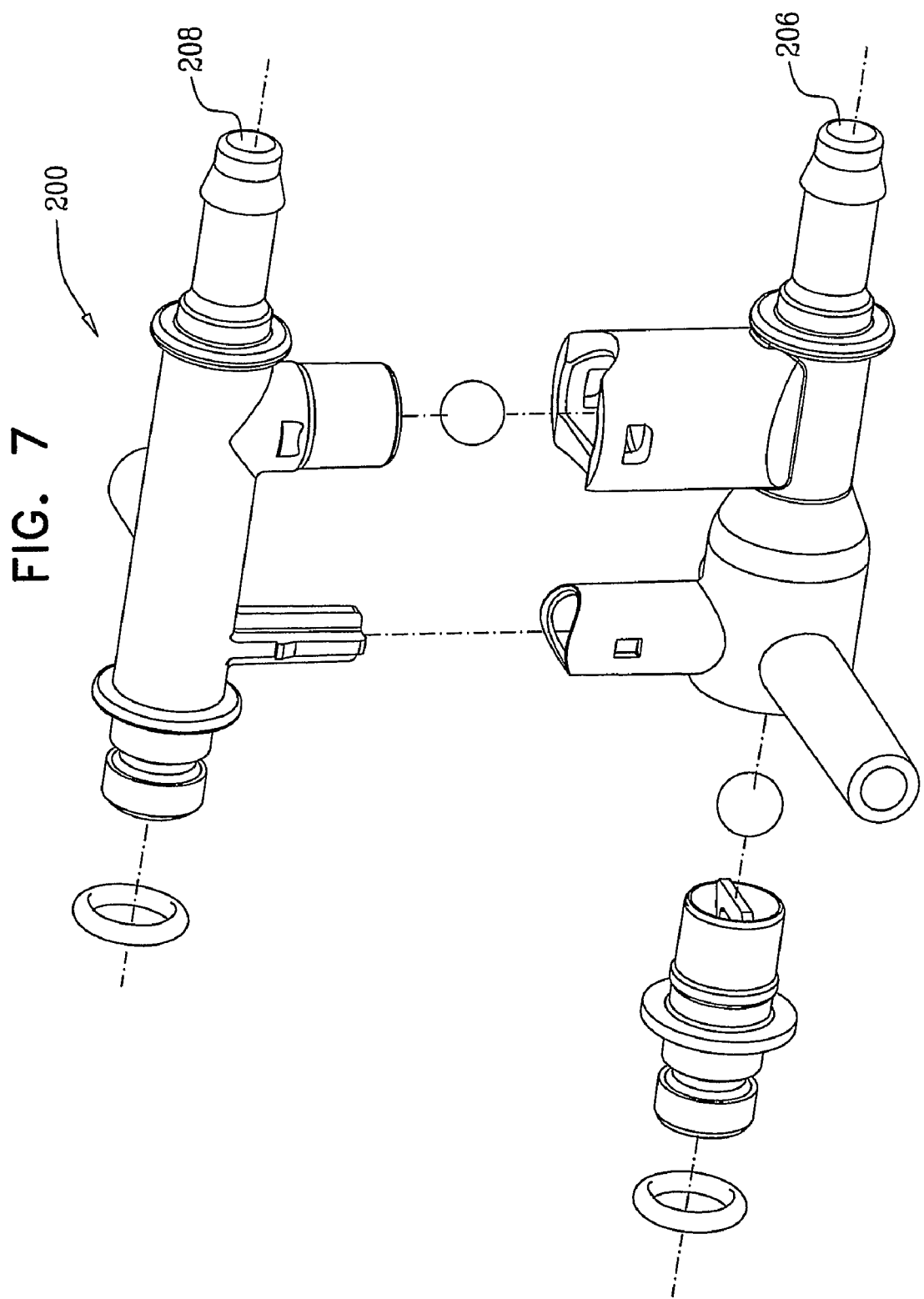
FIG. 7 is a simplified exploded view pictorial illustration of the manifold of FIGS. 1A-2B.
Figure 8A:
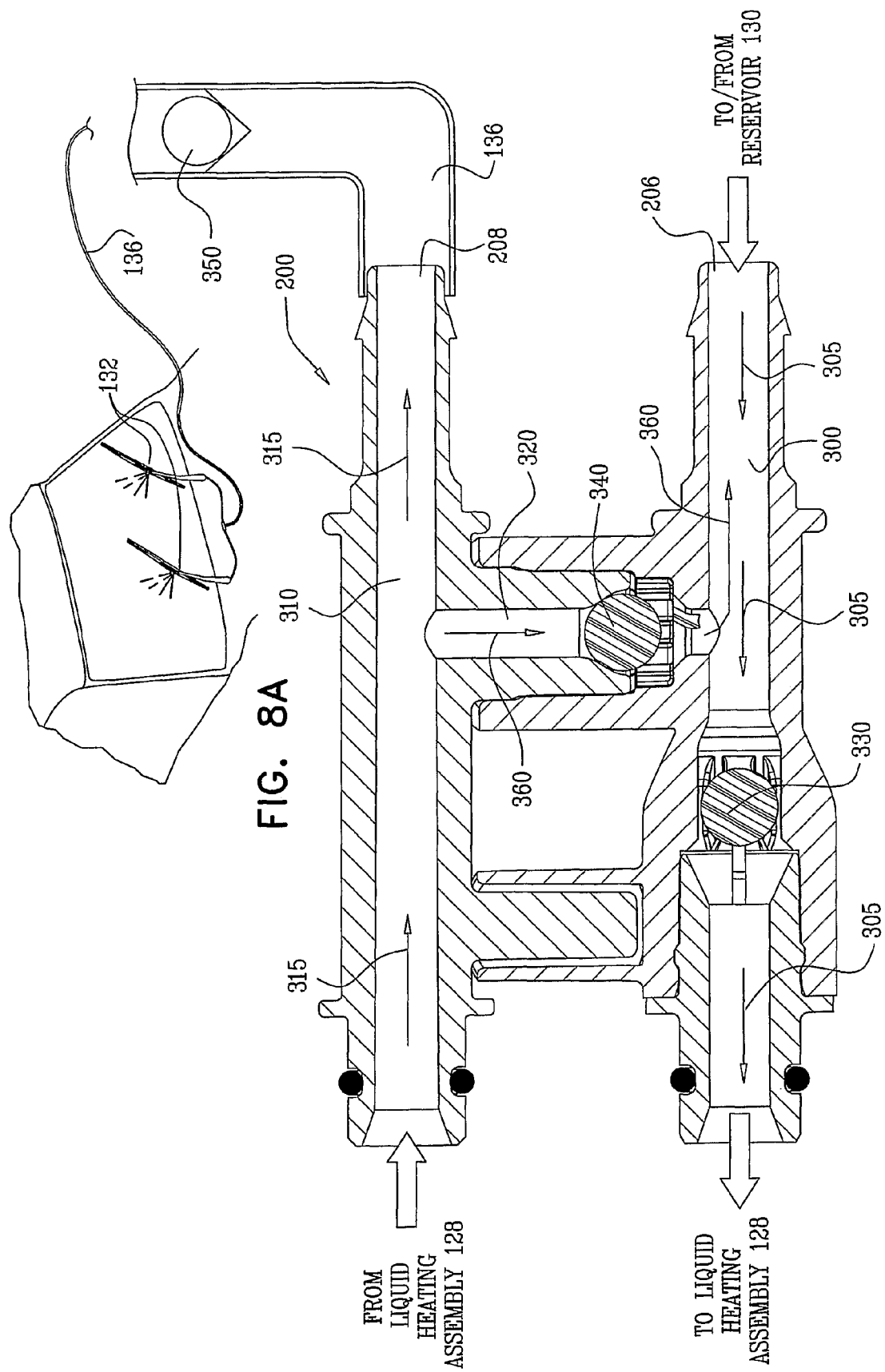

Reference is now made to FIG. 7, which is a simplified exploded view pictorial illustration of manifold 200 of FIGS. 1A-2B, and to FIGS. 8A and 8B, which are simplified sectional illustrations of manifold 200 in two different sprayer configurations.

As seen in FIGS. 7, 8A and 8B, manifold 200 preferably includes an input conduit 300, forming part of a first fluid flow path from reservoir 130 to liquid heating assembly 128, as indicated by arrows 305, and an output conduit 310, forming part of a second fluid flow path from liquid heating assembly 128 to at least one sprayer 132, as indicated by arrows 315. Input conduit 300 is preferably connected at inflow connector 206 to inlet 134 (FIG. 1A) and output conduit 310 is preferably connected at outflow connector 208 to outlet 136. Manifold 200 also includes a connecting conduit 320 connecting input conduit 300 and output conduit 310.

Input conduit 300 includes a first one-way valve 330 and connecting conduit 320 includes a second one-way valve 340. First one-way valve 330 is a normally closed valve, which prevents fluid flow from liquid heating assembly 128 to reservoir 130, and is opened when pump 140 (FIG. 1A) is operative to provide liquid under pressure from reservoir 130 to liquid heating assembly 128. Second one-way valve 340 is a normally open valve, when pump 140 is closed, which allows fluid to flow from output conduit 310 to input conduit 300, and is closed when pump 140 is operative to provide liquid under pressure from reservoir 130 to liquid heating assembly 128.

FIG. 8A illustrates the fluid flows provided by manifold 200 when used with a vehicle surface cleaning and de-icing system 120 including at least one additional one-way valve 350, along the second fluid flow path from liquid heating assembly 128 to sprayers 132, upstream of manifold 200 and downstream of sprayers 132. Additional one-way valve 350 is a normally closed valve, when pump 140 is closed, which is opened by pressure from liquid flowing to sprayers 132 from liquid heating assembly 128 when pump 140 is operative. Additional one-way valve 350 is generally provided in a vehicle to allow liquid to remain in outlet 136 when pump 140 is closed and thereby provides a shorter time interval, between the actuation of pump 140 and provision of liquid to sprayers 132, than when additional one-way valve 350 is not provided, as described hereinbelow with reference to FIG. 8B. The combination of second one-way valve 340 and additional one-way valve 350 is also operative to prevent liquid in outlet 136 from exiting through sprayers 132 when pump 140 is closed.

In this vehicle configuration, manifold 200 is operative to provide the following fluid flows during operation of liquid heating unit 126. When pump 140 is operative, in response to an input from controller 146, to provide liquid to liquid heating assembly 128, liquid under pressure is provided through inlet 134 to input conduit 300. The liquid is operative to open first one-way valve 330 to allow liquid to flow in the direction of arrows 305, and to close second one-way valve 340 so that liquid from liquid heating assembly 128 flows through output conduit 310, in the direction of arrows 315, through outlet 136 and additional one-way valve 350 to sprayers 132.

When pump 140 is closed, in response to an input from controller 146, first one-way valve 330 closes and prevents liquid flow from liquid heating assembly 128 to reservoir 130. When pump 140 is closed, second one-way valve 340 is open so that excess liquid and vapor, located upstream of first one-way valve 330 and downstream of additional one-way valve 350, including liquid and vapor in liquid heating assembly 128, output conduit 310, or outlet 136, will flow through connecting conduit 320, in the direction of arrows 360, through input conduit 300 to reservoir 130. The provision of second one-way valve 340 prevents this excess liquid and vapor from dripping through sprayers 132 onto windshield 124, or other vehicle surfaces located adjacent sprayers 132.

It is appreciated that in the event that at least one sprayer 132 includes multiple sprayers 132, each of multiple sprayers 132 must be located upstream of at least one additional valve 350.

FIG. 8B illustrates the fluid flows provided by manifold 200 when used with a vehicle surface cleaning and de-icing system 120 not including additional one-way valve 350 of FIG. 8A along the second fluid flow path from liquid heating assembly 128 to sprayers 132 upstream of manifold 200 and downstream of sprayers 132.

In this vehicle configuration, manifold 200 is operative to provide the following fluid flows during operation of liquid heating unit 126. When pump 140 is operative, in response to an input from controller 146, to provide liquid to liquid heating assembly 128, liquid under pressure is provided through inlet 134 to input conduit 300. The liquid is operative to open first one-way valve 330 to allow liquid to flow in the direction of arrows 305, and to close second one-way valve 340 so that liquid from liquid heating assembly 128 flows through output conduit 310, in the direction of arrows 315, through outlet 136 to sprayers 132.

When pump 140 is closed, in response to an input from controller 146, first one-way valve 330 closes and prevents liquid flow from liquid heating assembly 128 to reservoir 130. When pump 140 is closed, second one-way valve 340 opens so that excess liquid remaining upstream of valve 340, including liquid in outlet 136 and output conduit 310, will flow through connecting conduit 320, in the direction of arrows 360, through input conduit 300 to reservoir 130.

In the vehicle configuration of FIG. 8B, second one-way valve 340 in manifold 200 thus provides for the draining of fluid remaining in the fluid flow path upstream of second one-way valve 340 to reservoir 130 upon the conclusion of spraying.

The absence of additional one-way valve 350 permits liquid to drain when pump 140 is closed. This configuration requires a longer time interval, than the time interval required when additional one-way valve 350 is provided, between the actuation of pump 140 and provision of liquid to sprayers 132.

It is appreciated that the manifold 200 thus provides multiple fluid flow paths and is suitable for use both in vehicles that include additional one-way valve 350 and vehicles that do not include additional one-way valve 350.

Figure 9:
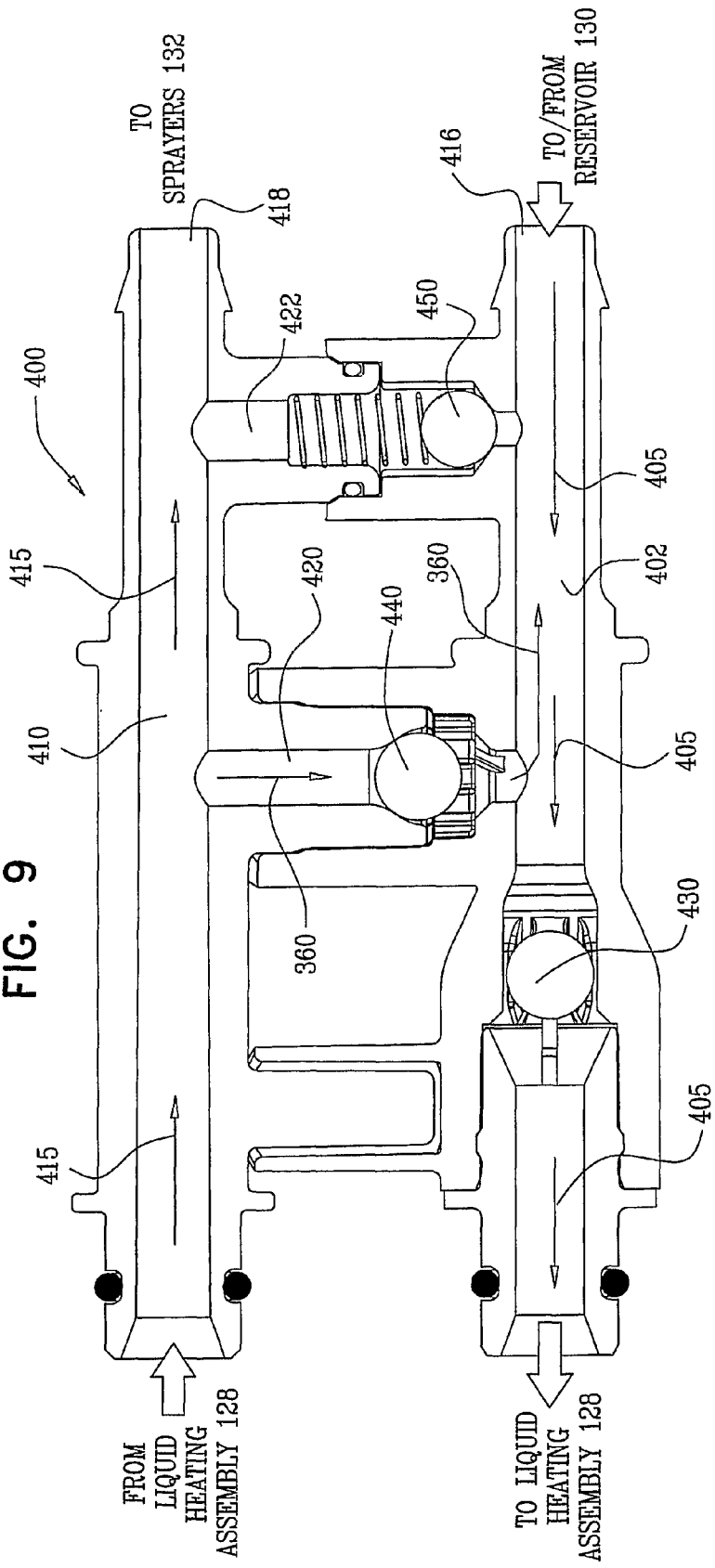
FIG. 9 is a simplified sectional illustration of a manifold for use with the liquid heating unit of FIGS. 1A-2B, in accordance with another preferred embodiment of the present invention.

Reference is now made to FIG. 9, which is a simplified sectional illustration of a manifold for use with the liquid heating unit of FIGS. 1-2B, in accordance with another preferred embodiment of the present invention.

As seen in FIG. 9, a manifold 400 preferably includes an input conduit 402, forming part of a first fluid flow path from reservoir 130 to liquid heating assembly 128, as indicated by arrows 405, and an output conduit 410, forming part of a second fluid flow path from liquid heating assembly 128 to sprayers 132, as indicated by arrows 415. Input conduit 402 is preferably connected at inflow connector 416 to inlet 134 (FIG. 1A) and output conduit 410 is preferably connected at outflow connector 418 to outlet 136 (FIG. 1A). Manifold 400 also includes a first connecting conduit 420 and a second connecting conduit 422 connecting input conduit 402 and output conduit 410.

Input conduit 402 includes a first one-way valve 430, first connecting conduit 420 includes a second one-way valve 440 and second connecting conduit 422 includes a bypass valve 450. First one-way valve 430 is a normally closed valve, which prevents fluid flow from liquid heating assembly 128 to reservoir 130 and is opened when pump 140 (FIG. 1A) is operative to provide liquid under pressure from reservoir 130 to liquid heating assembly 128. Second one-way valve 440 is a normally open valve, when pump 140 is closed, which allows fluid to flow from output conduit 410 to input conduit 402 and is closed when pump 140 is operative to provide liquid under pressure from reservoir 130 to liquid heating assembly 128. Bypass valve 450 is a spring loaded one-way valve which permits liquid to bypass liquid heating assembly 128 and flow directly from input conduit 402 through output conduit 410 and outlet 136 to sprayers 132, when the pressure differential thereacross reaches a predetermined threshold, typically 0.3-0.5 bar, which indicates the existence of a blockage in the fluid flow path through valve 430 and the liquid heating assembly 128.

Manifold 400 provides fluid flows similar to the fluid flows provided by manifold 200, as described hereinabove with reference to FIGS. 8A and 8B. Manifold 400 is thus also suitable for use both in vehicles that include additional one-way valve 350, as described hereinabove with reference to FIG. 8A, and vehicles that do not include additional one-way valve 350, as described hereinabove with reference to FIG. 8B.

Figure 10A:
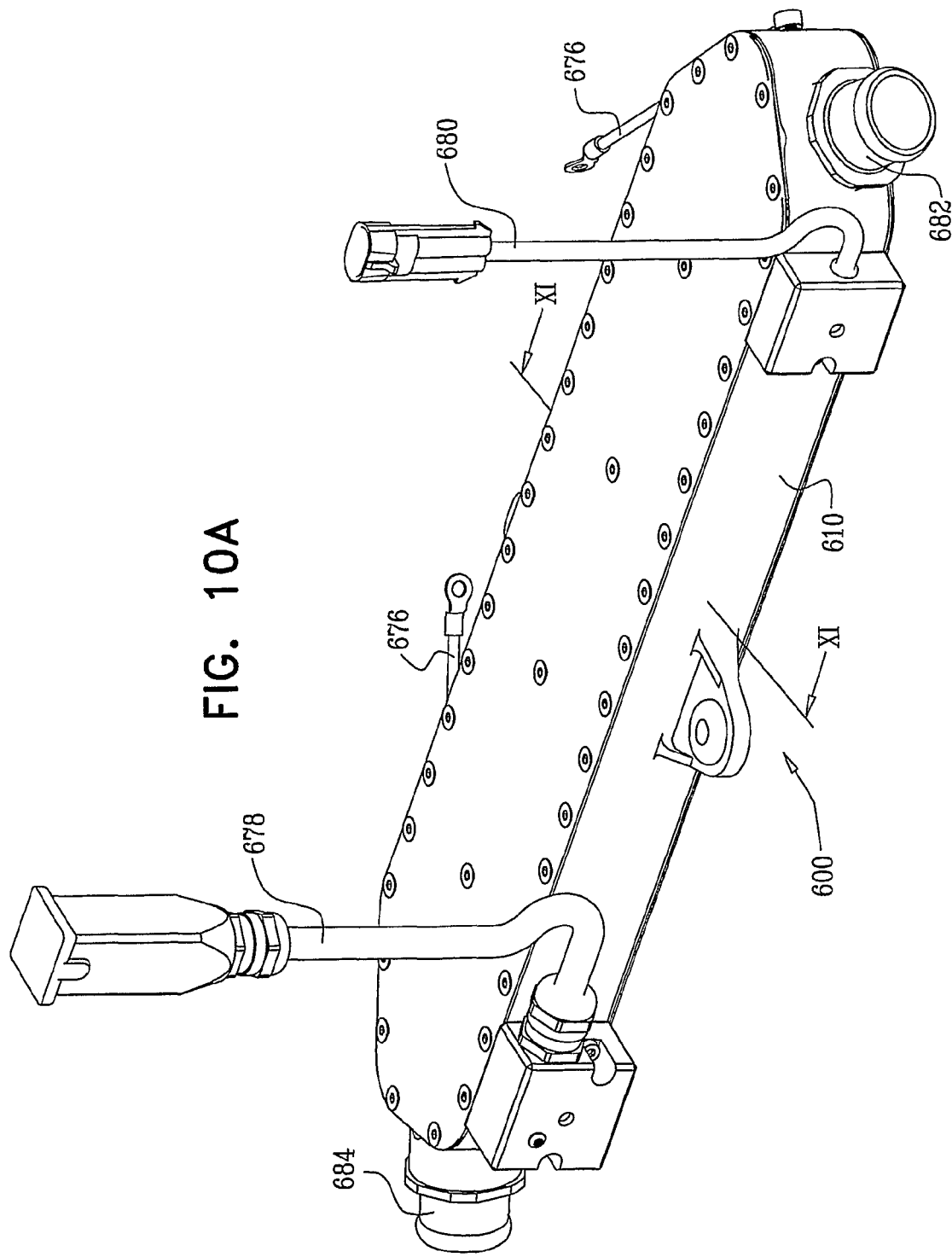
FIG. 10A is a simplified pictorial illustration of a liquid heater for use in the system of FIGS. 1A-2B, in accordance with another preferred embodiment of the present invention.
Figure 10B:
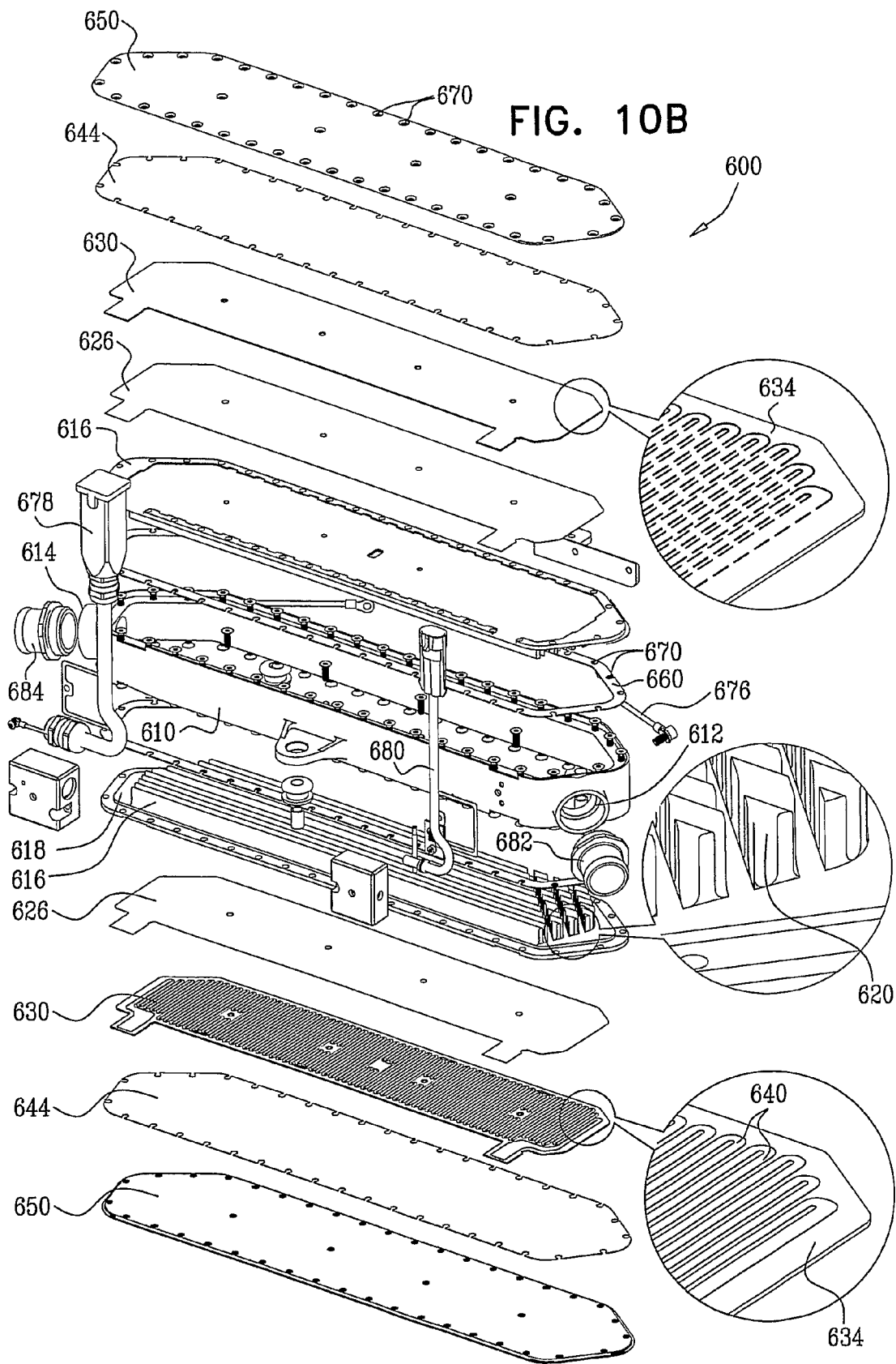
FIG. 10B is a simplified exploded view pictorial illustration of the liquid heater of FIG. 10A.
Figure 11:
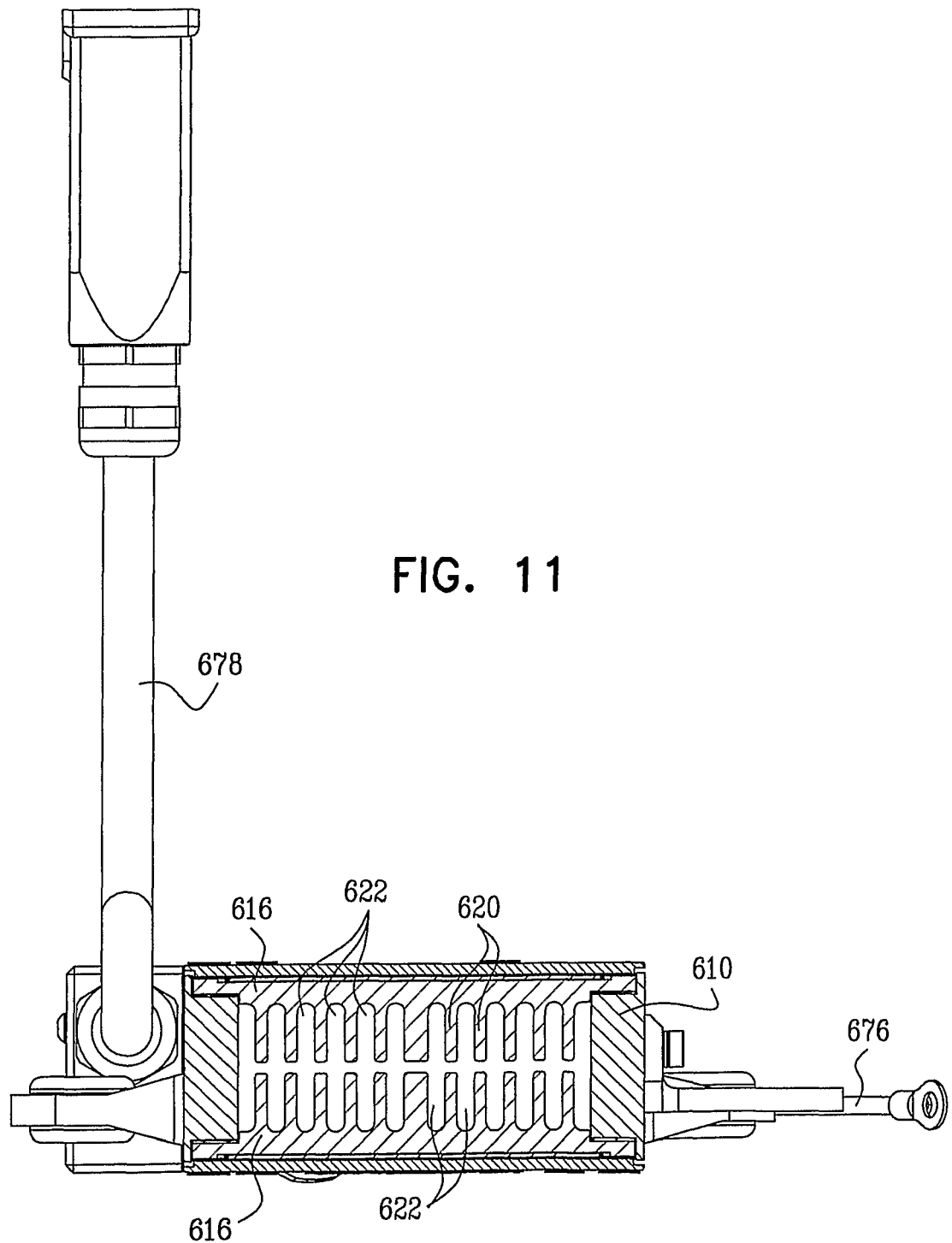
FIG. 11 is a simplified sectional illustration of the liquid heater of FIGS. 10A and 10B, taken along lines XI-XI of FIG. 10A.

Reference is now made to FIGS. 10A, 10B and 11, which are, respectively, a simplified assembled pictorial illustration, a simplified exploded view pictorial illustration and a simplified sectional illustration of a liquid heater for use in the system of FIGS. 1A-2B.

As seen in FIGS. 10A, 10B and 11, a liquid heater 600 comprises a housing element 610 including an inlet 612 and an outlet 614. Housing element 610 is preferably formed of plastic, but may also be made of any suitable material, such as aluminum. Disposed within housing element 610 is at least one heat dissipation element 616, preferably a pair of heat dissipation elements 616, having formed, on an inward facing surface 618 thereof, protruding elements, such as ridges or protrusions 620. Ridges or protrusions 620 of heat dissipation element 616 define at least one liquid flow path, such as flow channels 622, preferably providing a large contact surface area for maximizing heat transfer to a liquid flowing therethrough. Flow channels 622 are preferably in fluid communication with inlet 612 and outlet 614.

An outward facing surface of heat dissipation element 616 preferably engages an electronically insulative, thermal conductive pad 626. An outward facing surface of thermal conductive pad 626 preferably engages a heating element 630. Electronically insulative, thermal conductive pad 626 is preferably formed of a non-electrically conductive, heat conductive material and provides electrical insulation between the heat dissipation element 616 and heating element 630 while providing good thermal conductivity.

Heating element 630 preferably comprises a substrate, such as a printed circuit board (PCB) 634, including at least one electrical circuit having formed on at least a portion thereof at least one heating trace 640, which preferably comprises copper, nickel or nickel-chrome. It is appreciated that heating trace 640 may comprise a different material than the material of the electrical circuit upon which it is formed or may comprise the same material as the electrical circuit upon which it is formed.

Heating trace 640 is preferably arranged in a generally serpentine arrangement to maximize the surface area of PCB 634 covered thereby and to maximize the heat provision therefrom. In a preferred embodiment, heating element 630 includes two heating traces 640, each arranged in a generally serpentine arrangement. PCB 634 may have mounted thereon sensors and other control circuitry elements, as described hereinbelow with reference to FIG. 12.

It is appreciated that heating trace 640 is preferably formed of a material, such as copper, nickel or nickel-chrome, having increased resistance as it is heated, thus generating less current, less power and less heat energy as the temperature increases. It is appreciated that by measuring the current through heating trace 640 and the voltage thereon, the resistance thereof may be calculated and correlated to the temperature thereof. This temperature generally provides an average temperature along heating trace 640, rather than a single location temperature that would be provided by a temperature sensor, and is preferably provided as an input for use in controlling heating element 630.

Liquid heater 600 may also include a power disconnect, such as a thermal fuse (not shown), as a protection mechanism against overheating. As described further hereinbelow, liquid heater 600 may also include at least one sensor and/or control circuitry integrated with PCB 634 to provide low cost, robust design and ease of assembly thereof.

An outward facing surface of heating element 630 preferably engages a thermal insulative pad 644. An outward facing surface of thermal insulative pad 644 preferably engages a pressure plate 650. Pressure plate 650 preferably is operative to ensure that heating element 630 is generally evenly pressed against heat dissipation element 616.

Liquid heater 600 also preferably includes a sealing frame 660 between dissipation element 616 and housing element 610. Preferably, housing element 610, dissipation element 616, pad 644, sealing frame 660 and pressure plate 650 are provided with a plurality of apertures 670 therearound, operative to accommodate screws or other connecting elements. Pressure plate 650 is preferably connected to housing element 610 by connecting elements such as screws, which preferably extend through apertures 670 in pressure plate 650, pad 644, dissipation element 616 and sealing frame 660 into apertures 670 in housing element 610.

A liquid preferably enters the system through inlet 612, and flows through flow channels 622 in thermal contact with ridges or protrusions 620 of heat dissipation elements 616 and is heated thereby. It is appreciated that the provision of electronically insulative, thermal conductive pads 626 provide electrical insulation between heat dissipation elements 616 and heating elements 630 while providing thermal conductivity to provide efficient heat transfer to liquid flowing through flow channels 622.

As described hereinabove, liquid heater 600 is particularly suitable for heating of liquids used in a vehicle, such as a fluid for cleaning or de-icing a vehicle surface. As described further hereinbelow, liquid heater 600 is also suitable for heating liquid fuel cell coolant, where the temperature of the fuel cell coolant must be maintained at a temperature greater than a minimum threshold temperature in order for the fuel cell to function properly.

It is appreciated that liquid heater 600 is suitable for heating high liquid flows, typically from 5-160 liters per minute (lpm). Liquid heater 600 preferably includes two operating modes, an idle mode, during which heating elements 630 are not energized and do not generate heat, and an operational mode, where heating elements 630 are energized and generate heat. Liquid heater 600 thus operates with little or no thermal hysteresis, since heat is generated only when heating elements 630 are energized and heat is not generated when power is removed from heating elements 630.

It is appreciated that the operational mode of liquid heater 600 may also include setting a power level for the operation of heating elements 630. The power level may be based on sensing a temperature of the liquid at any suitable point along the flow thereof, such as within liquid heater 600 or upstream or downstream therefrom, and comparing the liquid temperature to a threshold temperature, or any other suitable method. Liquid heater 600 may include at least one temperature sensor to monitor the temperature of the liquid to prevent overheating of the liquid. Additionally, liquid heater 600 may also include at least one temperature sensor to monitor the temperature of liquid heater 600 and to prevent excessive heating thereof. Additional temperature sensors may also be provided, such as a temperature sensor to measure a temperature within a vehicle external to liquid heater 600 or a temperature external to the vehicle.

Liquid heater 600 is also designed to minimize pressure drop at all flow rates. Heat dissipation elements 616 include a large surface area to maximize contact with the fluid and a flow channel designed to maximize the transfer of heat to the fluid.

Liquid heater 600 also preferably includes electrical connectors 676 and 678, and temperature sensor connector 680. An inlet connector 682 is attached to liquid heater 600 at inlet 612 is and an outlet connector 684 is attached to liquid heater 600 at outlet 614.

Figure 12:
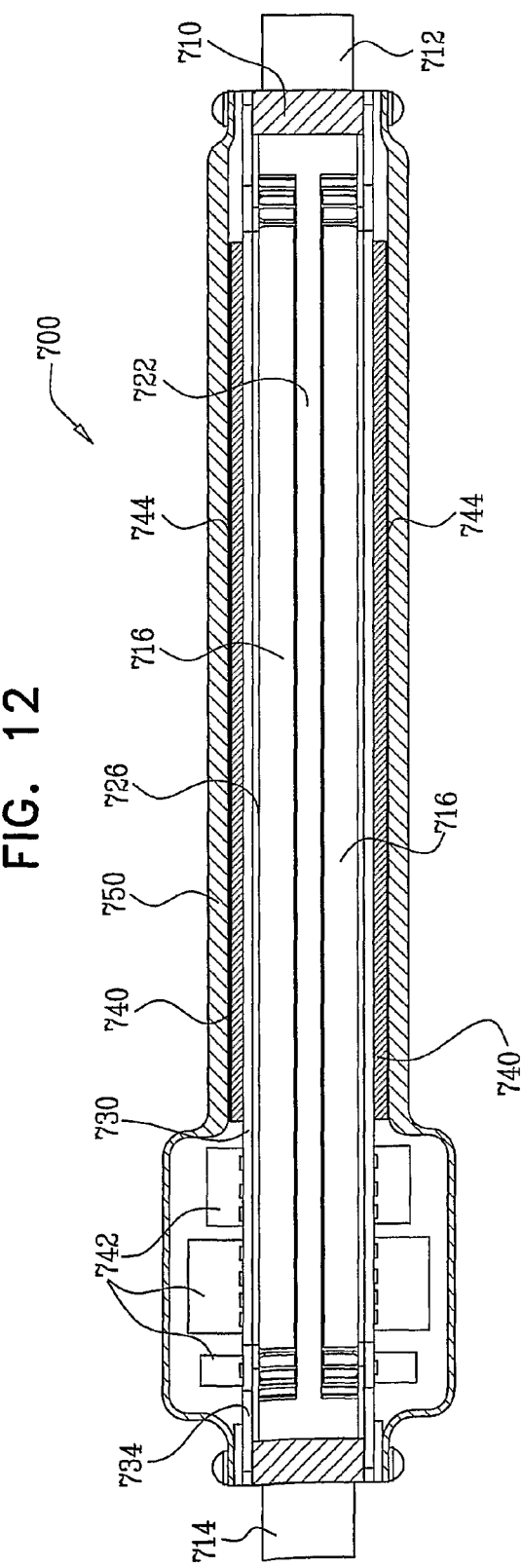
FIG. 12 is a simplified sectional illustration of a liquid heater, similar to the liquid heater of FIGS. 10A-11, constructed and operative in accordance with another embodiment of the present invention.

Reference is now made to FIG. 12, which is a simplified sectional illustration of a liquid heater, similar to the liquid heater of FIGS. 10A-11. As seen in FIG. 12, a liquid heater 700 comprises a housing element 710 including an inlet 712 and an outlet 714. Housing element 710 is preferably formed of plastic, but may also be made of any suitable material, such as aluminum. Disposed within housing element 710 is at least one heat dissipation element 716, preferably a pair of heat dissipation elements 716, having formed, on an inward facing surface thereof, protruding elements, such as ridges or protrusions. Ridges or protrusions of heat dissipation element 716 preferably define flow channels 722 providing a large contact surface area for maximizing heat transfer to a liquid flowing therethrough. Flow channels 722 are preferably in fluid communication with inlet 712 and outlet 714.

An outward facing surface of heat dissipation element 716 preferably engages an electronically insulative, thermal conductive pad 726. An outward facing surface of thermal conductive pad 726 preferably engages a heating element 730. Electronically insulative, thermal conductive pad 726 is preferably formed of a non-electrically conductive, heat conductive material and provides electrical insulation between the heat dissipation element 716 and heating element 730 while providing good thermal conductivity.

Heating element 730 preferably comprises a substrate, such as a printed circuit board (PCB) 734, including at least one electrical circuit having formed on at least a portion thereof at least one heating trace 740, preferably comprises copper, nickel or nickel-chrome. It is appreciated that heating trace 740 may comprise a different material than the material of the electrical circuit upon which it is formed or may comprise the same material as the electrical circuit upon which it is formed.

Heating trace 740 is preferably arranged in a generally serpentine arrangement to maximize the surface area of PCB 734 covered thereby and to maximize the heat provision therefrom. In a preferred embodiment, heating element 730 includes two heating traces 740, each arranged in a generally serpentine arrangement. The PCB 734 may have mounted thereon sensors and other control circuitry elements 742.

It is appreciated that heating trace 740 is preferably formed of a material, such as copper, nickel or nickel-chrome, having increased resistance as it is heated, thus generating less current, less power and less heat energy as the temperature increases. It is appreciated that by measuring the current through heating trace 740 and the voltage thereon, the resistance thereof may be calculated and correlated to the temperature thereof. This temperature generally provides an average temperature along heating trace 740, rather than a single location temperature that would be provided by a temperature sensor, and is preferably provided as an input for use in controlling heating element 730.

Liquid heater 700 may also include a power disconnect, such as a thermal fuse (not shown), as a protection mechanism against overheating.

An outward facing surface of heating element 730 preferably engages a thermal insulative pad 744. An outward facing surface of thermal insulative pad 744 preferably engages a pressure plate 750. Pressure plate 750 preferably is operative to ensure that heating element 730 is generally evenly pressed against the heat dissipation element 716.

Liquid heater 700 also preferably includes a sealing frame (not shown) between dissipation element 716 and housing element 710. Preferably, housing element 710, dissipation element 716, pad 744, sealing frame and pressure plate 750 are provided with a plurality of apertures therearound, operative to accommodate screws or other connecting elements. Pressure plate 750 is preferably connected to housing element 710 by connecting elements such as screws, which preferably extend through apertures in pressure plate 750, pad 744, dissipation element 716 and sealing frame into apertures formed in housing element 710.

A liquid preferably enters the system through inlet 712, and flows through flow channels 722 in thermal contact with ridges or protrusions of heat dissipation elements 716 and is heated thereby. It is appreciated that the provision of electronically insulative, thermal conductive pads 726 provide electrical insulation between heat dissipation elements 716 and heating elements 730 while providing thermal conductivity to provide efficient heat transfer to liquid flowing through flow channels 722.

As described hereinabove, liquid heater 700 is particularly suitable for heating of liquids used in a vehicle, such as a fluid for cleaning or de-icing a vehicle surface. As described further hereinbelow, liquid heater 700 is also suitable for heating liquid fuel cell coolant, where the temperature of the fuel cell coolant must be maintained at a temperature greater than a minimum threshold temperature in order for the fuel cell to function properly.

It is appreciated that liquid heater 700 is suitable for heating high liquid flows, typically from 5-160 liters per minute (lpm). Liquid heater 700 preferably includes two operating modes, an idle mode, during which heating elements 730 are not energized and do not generate heat, and an operational mode, where heating elements 730 are energized and generate heat. Liquid heater 700 thus operates with little or no thermal hysteresis, since heat is generated only when heating elements 730 are energized and heat is not generated when power is removed from heating elements 730.

It is appreciated that the operational mode of liquid heater 700 may also include setting a power level for the operation of heating elements 730. The power level may be based on sensing a temperature of the liquid at any suitable point along the flow thereof, such as within liquid heater 700 or upstream or downstream therefrom, and comparing the liquid temperature to a threshold temperature, or any other suitable method. Liquid heater 700 may include at least one temperature sensor to monitor the temperature of the liquid to prevent overheating of the liquid. Additionally, liquid heater 700 may also include at least one temperature sensor to monitor the temperature of liquid heater 700 and to prevent excessive heating thereof. Additional temperature sensors may also be provided, such as a temperature sensor to measure a temperature within a vehicle external to liquid heater 700 or a temperature external to the vehicle.

Liquid heater 700 is also designed to minimize pressure drop at all flow rates. Heat dissipation elements 716 include a large surface area to maximize contact with the fluid and a flow channel designed to maximize the transfer of heat to the fluid.

Figure 13:
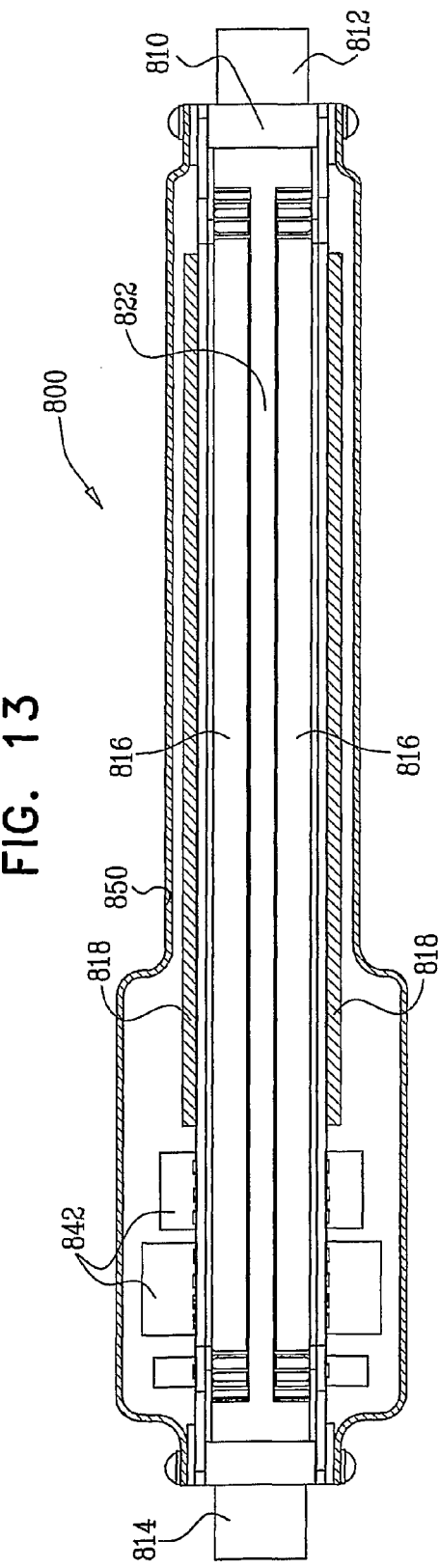
FIG. 13 is a simplified sectional illustration of another liquid heater, constructed and operative in accordance with another embodiment of the present invention.

Reference is now made to FIG. 13, which is a simplified sectional illustration of a liquid heater, similar to the liquid heater of FIGS. 10A-11. As seen in FIG. 13, a liquid heater 800 comprises a housing element 810 including an inlet 812 and an outlet 814. Housing element 810 is preferably formed of plastic, but may also be made of any suitable material, such as aluminum.

Disposed within housing element 810 is at least one heat transfer element 816, preferably a pair of heat transfer elements 816, having formed, on an inward facing surface thereof, protruding elements, such as ridges or protrusions. Heat transfer element 816 preferably comprises a substrate, such as a metal-backed circuit board, such as a Thermal Clad substrate commercially available from The Bergquist Company, 18930 West 78$^{th}$ Street, Chanhassen, Minn. 55317, U.S.A., with a resistive heating element 818 formed on an outer surface thereof.

Ridges or protrusions of heat transfer elements 816 preferably define flow channels 822 providing a large contact surface area for maximizing heat transfer to a liquid flowing therethrough. Flow channels 822 are preferably in fluid communication with inlet 812 and outlet 814.

Resistive heating element 818 preferably comprises at least one heating trace, which preferably includes copper, nickel or nickel-chrome, formed on at least a portion of an electrical circuit formed on the substrate. It is appreciated that the heating trace of heating element 818 may be formed of a different material than the material of the electrical circuit upon which it is formed or may comprise the same material as the electrical circuit upon which it is formed.

The heating trace of resistive heating element 818 is preferably arranged in a generally serpentine arrangement to maximize the surface area of outer surface of heat transfer element 816 covered thereby and to maximize the heat provision therefrom. In a preferred embodiment, resistive heating element 818 includes two heating traces, each arranged in a generally serpentine arrangement. As seen in FIG. 13, the substrate of heat transfer element 816 may have mounted thereon sensors and other control circuitry elements 842.

It is appreciated that resistive heating elements 818 are preferably formed of a material, such as copper, nickel or nickel-chrome, having increased resistance as it is heated, thus generating less current, less power and less heat energy as the temperature increases. It is appreciated that by measuring the current through resistive heating elements 818 and the voltage thereon, the resistance thereof may be calculated and correlated to the temperature thereof. This temperature generally provides an average temperature along resistive heating elements 818, rather than a single location temperature that would be provided by a temperature sensor, and is preferably provided as an input for use in controlling heating elements 818.

Liquid heater 800 may also include a power disconnect, such as a thermal fuse (not shown), as a protection mechanism against overheating.

Liquid heater 800 preferably also includes a cover element 850 and a sealing frame (not shown) between heat transfer elements 816 and housing element 810. Preferably, housing element 810, heat transfer elements 816, sealing frame and cover element 850 are provided with a plurality of apertures therearound, operative to accommodate screws or other connecting elements. Cover elements 850 are preferably connected to housing element 810 by connecting elements such as screws, which preferably extend through apertures in cover elements 850, heat transfer elements 816 and sealing frame into apertures formed in housing element 810.

A liquid preferably enters the system through inlet 812, and flows through flow channels 822 in thermal contact with ridges or protrusions of heat transfer elements 816 and is heated thereby.

As described hereinabove, liquid heater 800 is particularly suitable for heating of liquids used in a vehicle, such as a fluid for cleaning or de-icing a vehicle surface. As described further hereinbelow, liquid heater 800 is also suitable for heating liquid fuel cell coolant, where the temperature of the fuel cell coolant must be maintained at a temperature greater than a minimum threshold temperature, in order for the fuel cell to function properly.

It is appreciated that liquid heater 800 is suitable for heating high liquid flows, typically from 5-160 liters per minute (lpm). Liquid heater 800 preferably includes two operating modes, an idle mode, during which heating elements 818 are not energized and do not generate heat, and an operational mode, where heating elements 818 are energized and generate heat. Liquid heater 800 thus operates with little or no thermal hysteresis, since heat is generated only when heating elements 818 are energized and heat is not generated when power is removed from heating elements 818.

It is appreciated that the operational mode of liquid heater 800 may also include setting a power level for the operation of heating elements 818. The power level may be based on sensing a temperature of the liquid at any suitable point along the flow thereof, such as within liquid heater 800 or upstream or downstream therefrom, and comparing the liquid temperature to a threshold temperature, or any other suitable method. Liquid heater 800 may include at least one temperature sensor to monitor the temperature of the liquid to prevent overheating of the liquid. Additionally, liquid heater 800 may also include at least one temperature sensor to monitor the temperature of liquid heater 800 and to prevent excessive heating thereof. Additional temperature sensors may also be provided, such as a temperature sensor to measure a temperature within a vehicle external to liquid heater 800 or a temperature external to the vehicle.

Liquid heater 800 is also designed to minimize pressure drop at all flow rates. Heat transfer elements 816 include a large surface area to maximize contact with the fluid and a flow channel designed to maximize the transfer of heat to the fluid.

Reference is now made to FIG. 14, which is a simplified schematic illustration of a system for heating liquid for use by a vehicle fuel cell, constructed and operative in accordance with another preferred embodiment of the present invention. As seen in FIG. 14, the system 900 of the present invention includes a closed loop liquid circulation subsystem 904 controlled by a controller 908.

Closed loop liquid circulation subsystem 904 includes a liquid heater 912, such as liquid heater 600 of FIGS. 10A-11, liquid heater 700 of FIG. 12, liquid heater 800 of FIG. 13 or any other suitable liquid heater. Liquid heater 912 is preferably located in a vehicle upstream of a pump 916 supplying liquid to a fuel cell 920. A valve 924 and a radiator 928 are located downstream from fuel cell 920. A flow path directly from fuel cell 920 to liquid heater 912, bypassing radiator 928, via a bypass valve 932, is also provided.

As seen in FIG. 14, closed loop liquid circulation subsystem 904 includes a first liquid conduit 936 between fuel cell 920 and valves 924 and 932 and a second liquid conduit 940 between radiator 928 and liquid heater 912.

As seen in FIG. 14, closed loop circulation subsystem 904 defines a first liquid flow path, from liquid heater 912 via pump 916 to fuel cell 920 and back to liquid heater 912 through bypass valve 932, and a second liquid flow path, from liquid heater 912 via pump 916 to fuel cell 920, to radiator 928 through valve 924 and back to liquid heater 912.

Controller 908 is preferably in electrical communication with liquid heater 912, pump 916, fuel cell 920, valve 924, bypass valve 932 and radiator 928. Controller 908 is preferably operative to control the flow of liquid provided to fuel cell 920 to insure that the liquid is within an allowable temperature range suitable for operation of fuel cell 920.

Controller 908 is preferably operative to receive inputs from at least one temperature sensor, such as a temperature sensor (not shown) measuring the temperature of the liquid within liquid heater 912, a temperature sensor (not shown) measuring the temperature of the liquid within pump 916, a temperature sensor (not shown) measuring the temperature of the liquid within fuel cell 920 and/or a temperature sensor (not shown) measuring the temperature of the liquid within radiator 928. At least one additional temperature sensor (not shown) in communication with controller 908 may also be provided to measure the temperature of the liquid at points along the first and second liquid flow paths of closed loop circulation subsystem 904, such as along first liquid conduit 936 and second liquid conduit 940. Additional temperature sensors in communication with controller 908 may be provided, such as one or more temperature sensors 950 to measure a temperature outside of the vehicle and/or a temperature within the vehicle external to the engine compartment.

Controller 908 is operative to monitor the temperature of the liquid within closed loop circulation subsystem 904 and control the operation of liquid heater 912 to ensure that the operating temperature of fuel cell 920 is maintained within a predetermined range, typically between 60° C. and 95° C. Thus, when the temperature of the liquid in fuel cell 920 is below a first threshold, typically the lower extent of the predetermined range, controller 908 is preferably operative to set a power level of liquid heater 912 to a maximum heating level. When the temperature of the liquid in fuel cell 920 exceeds the first threshold, controller 908 may be operative to set a power level of liquid heater 912 to less than the maximum. It is appreciated that any suitable control method, such as on/off, PID, or other control method, may be used by controller 908 to control the operation of liquid heater 912.

When the temperature of the liquid in fuel cell 920 exceeds a second threshold, typically the upper extent of the predetermined range, controller 908 is operative to turn off the power to liquid heater 912.

Controller 908 may also be operative to control a flow rate of pump 916 based on the liquid temperature sensed and other available information to provide a suitable flow rate of liquid to fuel cell 920. It is appreciated that at least one flow sensor (not shown) in communication with controller 908 may be provided, such as a flow sensor located along first liquid conduit 936, second liquid conduit 940, in pump 916 or any other suitable location along common portions of the first and second flow paths.

Controller 908 is also operative to monitor the temperature of the liquid within closed loop circulation subsystem 904 to control liquid flow through valve 924 and bypass valve 932. Thus, when the temperature of the liquid in fuel cell 920 is below the first threshold, controller 908 is preferably operative to close valve 924 and open bypass valve 932 so that liquid flows along the first liquid flow path from fuel cell 920 to liquid heater 912 through bypass valve 932.

When the temperature of the liquid in fuel cell 920 exceeds the second threshold, controller 908 is preferably operative to open valve 924 and close bypass valve 932 so that liquid flows along the second liquid flow path from fuel cell 920 to radiator 928 through valve 924 and then to liquid heater 912.

It is appreciated that radiator 928 of closed loop liquid circulation subsystem 904 is provided to reduce the temperature of the liquid flowing through closed loop liquid circulation subsystem 904 in the event the temperature of the liquid exceeds the second predetermined threshold.

As seen in FIG. 14, controller 908 may receive additional inputs relating to the vehicle operating parameters, such as vehicle velocity, vehicle engine operating parameters, and other information provided by a vehicle computer, and may be operative to receive an actuation input, which may be a manually generated input signal or an automatically generated input signal, and a de-actuation input, which may be a manually generated input signal or an automatically generated input signal. Controller 908 is preferably in communication with a vehicle computer (not shown) to provide operating information relating to system 900 to the vehicle computer.

Fuel cell 920 is a conventional fuel cell. To provide the energy requirements for the operation of a vehicle, fuel cell 920 must achieve a desired current density level without degradation of fuel cell components. To provide optimal operation, the normal operating temperature of fuel cell 920 needs to be maintained within a predetermined range, typically between 60° C. and 95° C. Additionally, at operating temperatures of less than 25° C. fuel cell 920 operates inefficiently. It is appreciated that fuel cell 920 may be operative to reach the optimal temperature range with or without the operation of system 900 and system 900 may be operative to maintain the temperature of fuel cell 920 within the required range.

Alternatively, based on the ambient temperature conditions it may take fuel cell 920 a significant time period to get to reach the optimal operating temperature range without the operation of system 900. System 900 may be operative to provide heated liquid to fuel cell 920 to reduce the time period needed by fuel cell 920 to reach the optimal operating temperature range and thereby increase the efficiency of fuel cell 920 during freezing and cold ambient conditions.

It is also appreciated that, even though system 900 is shown in the context of a vehicle fuel cell, system 900 may be utilized with any other system utilizing a fuel cell. It is also appreciated that controller 908 and the functionality thereof may be part of liquid heater 912, pump 916, fuel cell 920 or radiator 928 or may be incorporated into a vehicle computer or any combination thereof.

Figures 15A, 15B:
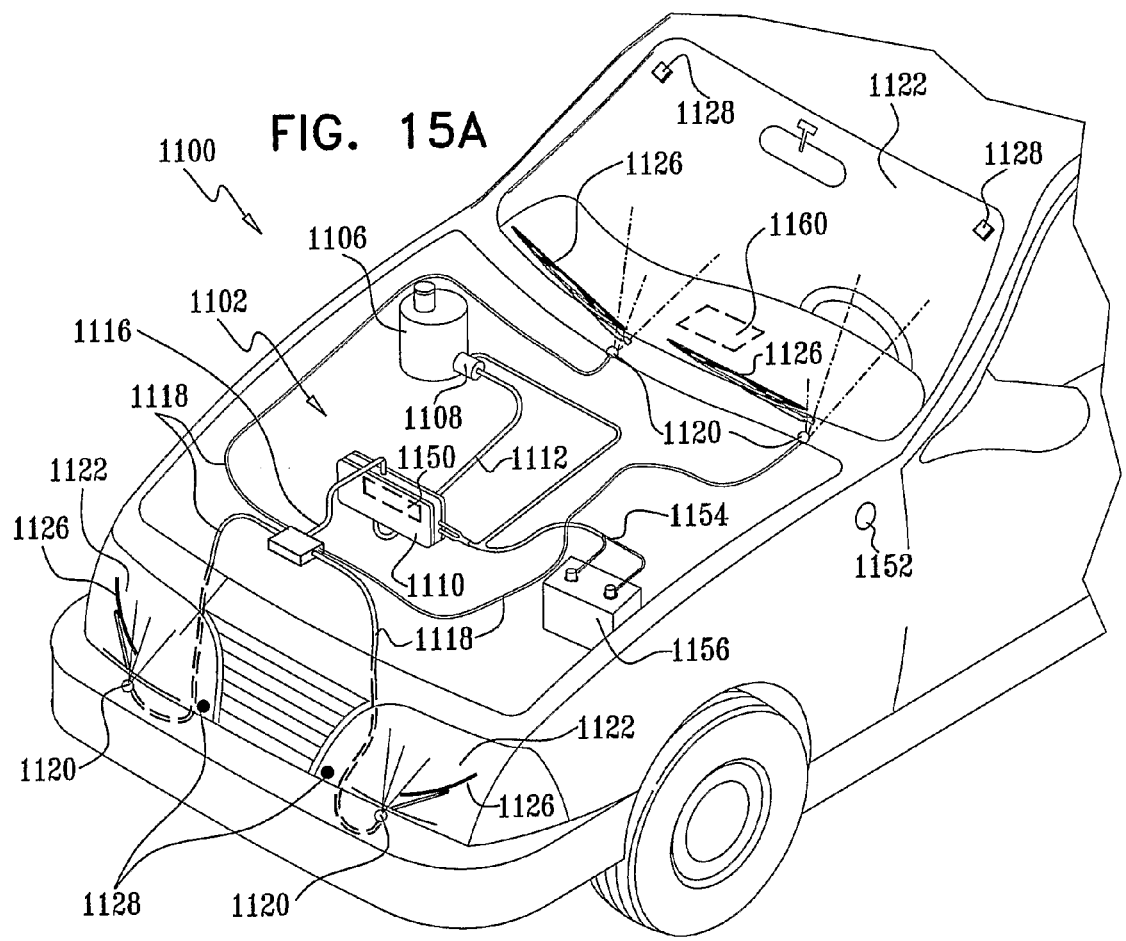
FIGS. 15A and 15B are simplified schematic illustrations of a vehicle surface cleaning and de-icing system including vehicle surface selection functionality, constructed and operative in accordance with another preferred embodiment of the present invention.

Reference is now made to FIGS. 15A and 15B, which are simplified schematic illustrations of a vehicle surface cleaning and deicing system including vehicle surface selection functionality, constructed and operative in accordance with another preferred embodiment of the present invention.

As seen in FIGS. 15A and 15B, a vehicle 1100 includes a vehicle surface cleaning and de-icing system 1102. Vehicle surface cleaning and de-icing system 1102 preferably includes at least one liquid reservoir, such as a liquid reservoir 1106, which contains liquid, such as water or windshield cleaning liquid. Preferably, at least one pump, such as a pump 1108, supplies the liquid to at least one liquid heating unit 1110 through at least one liquid inflow conduit 1112. Liquid from at least one liquid heating unit 1110 is preferably discharged via at least one liquid outflow conduit 1116 and a plurality of liquid spray supply conduits 1118 which supply liquid to a plurality of sprayers 1120 located adjacent to a plurality of vehicle surfaces 1122, such as headlights, windshield, rear window and tail lights. Preferably, a plurality of wipers 1126 are located in front of vehicle surfaces 1122 to wipe liquid and clean or de-ice vehicle surfaces 1122.

Preferably, at least one of vehicle surfaces 1122 is equipped with a dirt sensor 1128, preferably in communication with a vehicle surface cleaning and de-icing system controller 1150 and/or the existing vehicle computer. Dirt sensors 1128 are preferably operative to send individually recognizable signals to the vehicle surface cleaning and de-icing system controller 1150. Additional sensors, such as a liquid level sensor (not shown) associated with reservoir 1106, a rain sensor (not shown), at least one temperature sensor, such as a temperature sensor 1152 located on an external vehicle surface, a temperature sensor (not shown) associated with reservoir 1106, a temperature sensor (not shown) associated with liquid heating unit 1110, a temperature sensor (not shown) located internal to vehicle 1100, and other sensors, which provide input to vehicle surface cleaning and de-icing system controller 1150 and/or the vehicle computer, may also be provided.

It is appreciated that liquid heating unit 1110 and pump 1108 are preferably in electrical communication with the vehicle surface cleaning and de-icing system controller 1150 and/or the vehicle computer. It is also appreciated that the vehicle surface cleaning and de-icing system controller 1150 is preferably in electrical communication with the vehicle computer. Alternatively, the functionality of the vehicle surface cleaning and de-icing system controller 1150 may be included in the vehicle computer and the vehicle surface cleaning and de-icing system controller 1150 may be obviated.

Liquid heating unit 1110 is connected via electric cables 1154 to a vehicle battery 1156. Liquid heating unit 1110 may be any liquid heating device suitable for use in a vehicle, including but not limited to those described in applicants'/assignee's U.S. Pat. Nos. 6,164,564; 6,615,438; 6,6,669,105; 6,892,4171; 7,108,754 and 7,171,716, applicants'/assignee's U.S. patent application Ser. Nos. 11/610,287; 10/700,141; 10/477,486; 10/531,979 and 10/588,165 and applicants'/assignee's PCT Application Serial No. PCT/IL2006/001209, the disclosures of which are hereby incorporated by reference.

It is appreciated that even though the illustrated embodiment shows a separate reservoir 1106, vehicle surface cleaning and de-icing system 1102 may utilize an existing vehicle reservoir (not shown) to provide liquid to liquid heating unit 1110.

An actuator panel 1160 is typically located on the vehicle dashboard and includes an actuator (not shown) in communication with a vehicle surface cleaning and de-icing system controller 1150. The actuator panel 1160 preferably includes at least three operator actuator buttons, a first actuator button for actuating operation in an automatic spray mode, a second actuator button for actuating operation in an immediate spray mode and a third actuator button for actuating operation in an override mode. Alternatively, these functionalities may be included in a single operator actuator button having multiple actuation functionalities.

It is appreciated that additional actuator buttons may be provided for actuation of additional functionalities, such as a skip functionality or a discontinue functionality as described further hereinbelow.

Actuator panel 1160 may communicate with vehicle surface cleaning and de-icing system controller 1150 and/or the vehicle computer via RF communication, preferably wireless RF communication, or via a wired communication link. Additionally or alternatively, a portable actuator (not shown) in wireless communication with vehicle surface cleaning and de-icing system controller 1150 and/or the vehicle computer may be provided. Actuator panel 1160 or portable actuator may also include one or more LED indicators to provide system status information.

It is appreciated that the system of the present invention may either be installed as part of the window washing system in a new automobile, or it may be retrofitted into an existing washing system.

In accordance with a preferred embodiment of the present invention, described further hereinbelow with reference to FIG. 16, the vehicle surface cleaning and de-icing system controller 1150 and/or the vehicle computer is operative to receive at least one input relating to at least one vehicle operating parameter, to select at least one of the plurality of vehicle surfaces 1122 to be cleaned, based at least partially on the at least one input relating to the at least one vehicle operating parameter, and to provide a liquid discharge onto the selected at least one vehicle surface 1122.

The at least one input relating to at least one vehicle operating parameter may be an input selected from one of the following: a current gear selection, such as park, neutral, reverse, drive, hi gear, low gear; an engine on/off indication; an engine speed above or below idling speed indication; a vehicle speed and direction of vehicle movement indicator, such as forward, backward or not moving; a vehicle load, such as an engine output torque or an engine power level, or any other suitable vehicle operating parameter available in the vehicle computer.

Vehicle surface cleaning and de-icing system controller 1150 and/or the vehicle computer may utilize one or more additional inputs, such as a sensor input, as described further hereinbelow, to select the at least one vehicle surface 1122 to be cleaned. It is appreciated that once the at least one vehicle surface 1122 has been selected the liquid discharge may be initiated immediately or may be initiated subsequently, based on an input from controller 1150.

It is appreciated that the vehicle surface cleaning and de-icing system controller 1150 is preferably operative to activate a specific liquid heating unit 1110 and/or pump 1108 corresponding to at least one vehicle surface 1122 selected. Alternatively, multiple heating units 1110 and/or multiple pumps 1108 may be activated. Additionally, selection of the at least one vehicle surface 1122 to be cleaned may also include defining a specific liquid path for providing the liquid discharge onto the selected vehicle surface 1122.

In accordance with another preferred embodiment of the present invention, vehicle surface cleaning and de-icing system controller 1150 may be operative to provide multiple iterations of receiving at least one input relating to at least one vehicle operating parameter, selecting at least one vehicle surface 1122 to be cleaned, based at least partially on the at least one input relating to the at least one vehicle operating parameter, and providing a liquid discharge onto the selected at least one vehicle surface 1122. Vehicle surface cleaning and de-icing system controller 1150 and/or the vehicle computer may additionally utilize one or more inputs to select the at least one vehicle surface 1122 to be cleaned. It is appreciated that once the at least one vehicle surface 1122 has been selected the liquid discharge may be initiated immediately or may be initiated subsequently, based on an input from controller 1150.

In accordance with yet another preferred embodiment of the present invention, vehicle surface cleaning and de-icing system controller 1150 may be operative to monitor the at least one vehicle operating parameter, and to select the at least one vehicle surface 1122 to be cleaned only when the at least one vehicle operating parameter changes.

In accordance with yet another preferred embodiment of the present invention, vehicle surface cleaning and de-icing system controller 1150 may be operative to select multiple vehicle surfaces 1122 to be cleaned in a sequential order, based at least partially on the at least one input relating to the at least one vehicle operating parameter. Vehicle surface cleaning and de-icing system controller 1150 and/or the vehicle computer may utilize one or more additional inputs, such as a sensor input, as described further hereinbelow, to select the multiple vehicle surfaces 1122 and to provide the sequential order in which the multiple vehicle surface 1122 may be cleaned.

It is appreciated that once the sequential order has been selected the first liquid discharge in the sequential order may be initiated immediately or may be initiated subsequently, based on an input from vehicle surface cleaning and de-icing system controller 1150. It is also appreciated that while vehicle surface cleaning and de-icing system controller 1150 may provide each subsequent liquid discharge in the sequential order only after the conclusion of the previous discharge, each subsequent liquid discharge in the sequential order may be initiated at any time following the initiation of the previous liquid discharge in the sequence and need not wait until the conclusion thereof. Thus, vehicle surface cleaning and deicing system controller 1150 may be operative to provide multiple liquid discharges simultaneously.

It is appreciated that vehicle surface cleaning and de-icing system controller 1150 typically provides liquid discharges by providing an input to pump 1108. Additionally, vehicle surface cleaning and de-icing system controller 1150 may be in communication with one or more valves to provide liquid discharges to selected vehicle surfaces 1122.

Thus, for example, if vehicle 1100 is moving in a forward direction, vehicle surface cleaning and de-icing system controller 1150 may be operative to provide the following sequence of vehicle surfaces 1122 to be cleaned: windshield, right headlight, left headlight, rear window, right tail light and left tail light. Alternatively, if vehicle 1100 is moving in a forward direction and dirt sensor 1128 adjacent the right headlight indicates that a level of dirt has exceeded a dirt threshold, vehicle surface cleaning and de-icing system controller 1150 may be operative to provide the following sequence of vehicle surfaces 1122 to be cleaned: right headlight, windshield, left headlight, rear window, right tail light and left tail light. When vehicle 1100 is moving in a reverse direction, vehicle surface cleaning and de-icing system controller 1150 may be operative to provide the following sequence of vehicle surfaces 1122 to be cleaned: rear window, right tail light, left tail light, windshield, right headlight and left headlight.

It is appreciated that vehicle surface cleaning and de-icing system controller 1150 may be operative to provide a sequence of vehicle surfaces 1122 to be cleaned that includes all of the plurality of vehicle surfaces 1122 or any subset thereof.

It is appreciated that when vehicle surface cleaning and de-icing system controller 1150 is operative to provide automatic liquid discharge onto multiple surfaces in a sequential order, a slip input may also be provided, such as by a vehicle operator, to vehicle surface cleaning and de-icing system controller 1150, so that vehicle surface cleaning and de-icing system controller 1150 will skip the next vehicle surface 1122 in the sequential order. Additionally or alternatively, a discontinue input may also be provided, such as by a vehicle operator, to vehicle surface cleaning and de-icing system controller 1150, so that vehicle surface cleaning and de-icing system controller 1150 will immediately discontinue liquid discharge onto the current vehicle surface 1122.

In another embodiment of the present invention, when vehicle surface cleaning and de-icing system controller 1150 is operative to provide automatic liquid discharge onto multiple surfaces in a sequential order, a switch front/rear functionality input may be provided to vehicle surface cleaning and de-icing system controller 1150 to be operative to switch the sequential order to provide liquid discharges on front vehicle surfaces 1122 prior to rear vehicle surfaces or vice versa.

It is appreciated that vehicle surface cleaning and de-icing system controller 1150 and/or the vehicle computer may also receive additional inputs from one or more sensors, such as a liquid level input from a liquid level sensor associated with reservoir 1106, a rain indication from a rain sensor, a dirt level input from dirt sensor 1128, a temperature sensed by temperature sensor 1152, a temperature sensed by the temperature sensor associated with reservoir 1106, a temperature sensed by the temperature sensor associated with liquid heating unit 1110, a temperature sensed by the temperature sensor located internal to vehicle 1100, or any other suitable sensor input.

Reference is now made to FIG. 16, which is a simplified flow chart of a preferred mode of operation of the vehicle surface selection functionality of vehicle surface cleaning and de-icing system of FIGS. 15A and 15B. As seen in FIG. 16, vehicle surface cleaning and de-icing system controller 1150 may be operative in an automatic mode of operation to select a vehicle surface 1122 to be cleaned or to provide a sequence of vehicle surfaces 1122 to be cleaned.

In a preferred embodiment of the present invention, vehicle surface cleaning and de-icing system controller 1150 is operative, upon vehicle start up or vehicle surface cleaning and de-icing system 1102 actuation by a user, in an automatic mode, to receive at least one input relating to at least one vehicle operating parameter, for example, a current gear selection, such as park, and/or a direction of vehicle movement indicator, such as not moving. Vehicle surface cleaning and de-icing system controller 1150 may then be operative to receive at least one sensor input, such as an input from a liquid level sensor.

Based at least partially on the at least one input relating to at least one vehicle operating parameter, vehicle surface cleaning and de-icing system controller 1150 is then operative to select at least one first vehicle surface 1122 to be cleaned and to provide a liquid discharge onto the at least one first vehicle surface 1122. It is appreciated that once the at least one vehicle surface 1122 has been selected the liquid discharge may be initiated immediately or may be initiated subsequently, based on an input from controller 1150.

In accordance with another preferred embodiment, vehicle surface cleaning and de-icing system controller 1150 may also be operative to select one or more additional vehicle surfaces 1122 to be cleaned in a sequential order, based at least partially on the input relating to at least one vehicle operating parameter. It is appreciated that vehicle surface cleaning and de-icing system controller 1150 may be operative to select one or more additional vehicle surfaces 1122 to be cleaned in a sequential order before providing the liquid discharge onto the first selected vehicle surface 1122 or after providing the liquid discharge onto the first selected vehicle surface 1122.

Alternatively, at the conclusion of the liquid discharge onto the first vehicle surface 1122, vehicle surface cleaning and de-icing system controller 1150 may be operative to repeat the selection and discharge process. Thus, vehicle surface cleaning and de-icing system controller 1150 may be operative to receive at least one input relating to at least one vehicle operating parameter, to select a vehicle surface 1122 to be cleaned, based at least partially on the input relating to at least one vehicle operating parameter, and to provide a liquid discharge onto the selected vehicle surface 1122.

It is appreciated that in the alternative embodiment described above, vehicle surface cleaning and de-icing system controller 1150 may also may be operative to receive at least one sensor input, as described above, and may also be operative to save a history of vehicle surfaces 1122 that have been cleaned as an input to the selection process.

As described hereinabove, actuator 1160 preferably also includes an override mode actuator button for operation of vehicle surface cleaning and de-icing system 1102 in an override mode. In override mode, the automatic operation of vehicle surface cleaning and de-icing system 1102 is disabled and all liquid discharges are provided only upon manual user actuation.

Additionally, as described hereinabove, actuator 1160 preferably also includes an immediate mode actuator button for operation of vehicle surface cleaning and de-icing system 1102 in an immediate spray mode. In immediate spray mode, the automatic operation of vehicle surface cleaning and de-icing system 1102 is temporarily disabled so that an immediate liquid discharge on the windshield can be provided, following which vehicle surface cleaning and de-icing system controller 1150 resumes operation in automatic mode.

As described hereinabove, it is appreciated that the automatic mode of the vehicle surface cleaning and de-icing system 1102 may be actuated automatically upon vehicle start up or may be actuated by user actuation. It is appreciated that the automatic mode of operation of vehicle surface cleaning and de-icing system 1102 may be operative whenever vehicle 1100 is operative or may be controlled by user actuation and user de-actuation.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

The invention claimed is:

1. A liquid heater comprising:
   a housing having a continuous, substantially vertical side wall, said side wall defining an area therein and having a liquid inlet and a liquid outlet therein;
   a first heat dissipation element, having opposing inner and outer surfaces, disposed against a first edge of said housing side wall and orthogonal thereto, said first heat dissipation element having heat transfer projections extending from said inner surface into said area defined by said side wall, said housing and said first heat dissipation element at least partially defining a liquid flow path between said inlet and said outlet; and
   a first heating element disposed proximate said outer surface of said first heat dissipation element, said first heating element operative to heat said first heat dissipation element and thereby liquid flowing within said housing along said liquid flow path, said first heating element comprising
   a circuit board substrate,
   at least one electrical circuit formed on said circuit board substrate, and
   at least one heating trace formed over at least a portion of said at least one electrical circuit.

2. A liquid heater according to claim 1 and wherein said at least one heating trace and said at least one electrical circuit are formed of the same material.

3. A liquid heater according to claim 1 and wherein said at least one heating trace and said at least one electrical circuit are formed of different materials.

4. A liquid heater according to claim 1 and wherein said at least one heating trace is formed of a composite material.

5. A liquid heater according to claim 1 and wherein said at least one heating trace includes at least one serpentine heating trace.

6. The liquid heater of claim 1, further comprising:
   a first electrically insulative, thermally conductive pad disposed between and in mechanical contact with said first heating element and said first heat dissipation element.

7. The liquid heater of claim 6, further comprising:
   a first thermally insulative pad; and
   a first pressure plate,
   wherein said first thermally insulative pad is disposed against an outer surface of said first heating element and said first pressure plate is disposed against an outer surface of said first thermally insulative pad, said first pressure plate operative to apply pressure against said first heating element, via said first thermally insulative pad, to thereby cause said first heating element to apply pressure against said first heat dissipation element.

8. The liquid heater of claim 1, further comprising:
   a second heat dissipation element, having opposing inner and outer surfaces, disposed against a second edge of said housing side wall and orthogonal thereto, opposite said first heat dissipation element, said second heat dissipation element having heat transfer projections extending from said inner surface thereof into said area defined by said side wall, said housing and said second heat dissipation element at least partially defining said liquid flow path between said inlet and said outlet; and
   a second heating element disposed proximate said housing and said outer surface of said second heat dissipation element, said second heating element operative to heat said second heat dissipation element and thereby liquid flowing within said housing along said liquid flow path, said second heating element comprising
   a circuit board substrate,
   at least one electrical circuit formed on said circuit board substrate, and
   at least one heating trace formed over at least a portion of said at least one electrical circuit,
   wherein said heat transfer projections of said first and second heat dissipation elements are spaced apart within said housing, thereby forming an unobstructed flow path between said inlet and said outlet.

9. The liquid heater of claim 8, further comprising:
   a second electrically insulative, thermally conductive pad disposed between and in mechanical communication with said second heating element and said second heat dissipation element.

10. The liquid heater of claim 8, further comprising:
    a second thermally insulative pad; and
    a second pressure plate,
    wherein said second thermally insulative pad is disposed against an outer surface of said second heating element and said second pressure plate is disposed against an outer surface of said second thermally insulative pad, said second pressure plate operative to apply pressure against said second heating element, via said second thermally insulative pad, to thereby cause said second heating element to apply pressure against said second heat dissipation element.

* * * * *

UNITED STATES PATENT AND TRADEMARK OFFICE
CERTIFICATE OF CORRECTION

PATENT NO. : 8,391,695 B2  
APPLICATION NO. : 12/374105  
DATED : March 5, 2013  
INVENTOR(S) : Uri Arkashevski et al.

Page 1 of 1

It is certified that error appears in the above-identified patent and that said Letters Patent is hereby corrected as shown below:

Title Page, Item (12) "Arkashovski et al" should read --Arkashevski et al--;

Title Page, Item (75) Inventors: "Uri Arkashovski" should read --Uri Arkashevski--;

In the Specification:

Column 19, line 11, "6,6,669,105" should read --6,669,105--; and

Column 21, line 35, "slip" should read --skip--.

Signed and Sealed this
Twenty-second Day of October, 2013

Teresa Stanek Rea
*Deputy Director of the United States Patent and Trademark Office*